United States Patent
Lee et al.

(10) Patent No.: US 10,911,756 B2
(45) Date of Patent: Feb. 2, 2021

(54) VIDEO ENCODING/DECODING METHOD AND APPARATUS, AND RECORDING MEDIUM IN WHICH BIT STREAM IS STORED

(71) Applicants: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR); HANBAT NATIONAL UNIVERSITY INDUSTRY—ACADEMIC COOPERATION FOUNDATION, Daejeon (KR)

(72) Inventors: Jin Ho Lee, Daejeon (KR); Jung Won Kang, Daejeon (KR); Hyun Suk Ko, Daejeon (KR); Sung Chang Lim, Daejeon (KR); Ha Hyun Lee, Seoul (KR); Dong San Jun, Daejeon (KR); Seung Hyun Cho, Daejeon (KR); Hui Yong Kim, Daejeon (KR); Hae Chul Choi, Daejeon (KR); Aram Back, Daejeon (KR); Jin Soo Choi, Daejeon (KR); Jae Gon Kim, Goyang-si (KR)

(73) Assignees: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 0 days.

(21) Appl. No.: 16/342,310

(22) PCT Filed: Oct. 23, 2017

(86) PCT No.: PCT/KR2017/011722
§ 371 (c)(1),
(2) Date: Apr. 16, 2019

(87) PCT Pub. No.: WO2018/080122
PCT Pub. Date: May 3, 2018

(65) Prior Publication Data
US 2020/0053359 A1   Feb. 13, 2020

(30) Foreign Application Priority Data
Oct. 28, 2016   (KR) ........................ 10-2016-0142274

(51) Int. Cl.
*H04N 19/46*   (2014.01)
*H04N 19/176*   (2014.01)
(Continued)

(52) U.S. Cl.
CPC ......... *H04N 19/119* (2014.11); *H04N 19/105* (2014.11); *H04N 19/176* (2014.11); *H04N 19/186* (2014.11); *H04N 19/46* (2014.11)

(58) Field of Classification Search
CPC .... H04N 19/11; H04N 19/159; H04N 19/176; G06F 17/18
See application file for complete search history.

(56) References Cited

U.S. PATENT DOCUMENTS

| | | |
|---|---|---|
| 2016/0198189 A1 | 7/2016 | Lee et al. |
| 2016/0255363 A1 | 9/2016 | Kim et al. |

(Continued)

FOREIGN PATENT DOCUMENTS

| | | |
|---|---|---|
| KR | 10-2012-0072357 A | 7/2012 |
| KR | 10-2013-0129469 A | 11/2013 |

(Continued)

OTHER PUBLICATIONS

International Search Report dated Jan. 23, 2018 in counterpart International Patent Applciation No. PCT/KR2017/011722 (5 pages in English and 5 pages in Korean).

*Primary Examiner* — Tsion B Owens
(74) *Attorney, Agent, or Firm* — NSIP Law

(57) ABSTRACT

An image encoding/decoding method and apparatus are provided. An image decoding method performed by an image decoding apparatus of the present invention may comprise decoding an indicator indicating whether or not (Continued)

partition information of a current block is derived from partition information of a corresponding block of the current block, obtaining the partition information of the current block based on the decoded indicator, and partitioning the current block based on the obtained partition information.

14 Claims, 32 Drawing Sheets

(51) Int. Cl.
  *H04N 19/119* (2014.01)
  *H04N 19/105* (2014.01)
  *H04N 19/186* (2014.01)

(56) References Cited

U.S. PATENT DOCUMENTS

2019/0260992 A1* 8/2019 Jin ................. H04N 19/186
2020/0036985 A1* 1/2020 Jang ................ H04N 19/105

FOREIGN PATENT DOCUMENTS

| | | |
|---|---|---|
| KR | 10-2014-0088099 A | 7/2014 |
| KR | 10-2014-0136562 A | 12/2014 |
| KR | 10-2015-0003219 A | 1/2015 |
| KR | 10-2016-0048748 A | 5/2016 |
| KR | 10-2017-0077203 A | 7/2017 |
| WO | WO 2012/122355 A1 | 9/2012 |
| WO | WO 2013/075589 A1 | 5/2013 |
| WO | WO 2013/160695 A1 | 10/2013 |

* cited by examiner

FIG. 7

| | | | | Chroma QTSplitFlag | Chroma BTSplitMode |
|---|---|---|---|---|---|
| (a) | CTU Level | ChromaSplitDerivedFlag | 0 | — | signaling | signaling |
| | | | 1 | ChromaBTSplitModeDerivedFlag | not signaling | signaling |
| (b) | CTU Level | ChromaBTSplitModeDerivedFlag | 0 | | not signaling | not signaling |
| | | | 1 | | not signaling | not signaling |
| (c) | CTU Level | ChromaQTBTDerivedFlag | 0 | | signaling | signaling |
| | | | 1 | | not signaling | not signaling |

| | CU Level | BlockSize > Threshold | ChromaSplitDerivedFlag | ChromaBTSplitModeDerivedFlag | Chroma QT SplitFlag | Chroma BTSplitMode |
|---|---|---|---|---|---|---|
| (a) | | N | — | — | signaling | signaling |
| | | Y | 0 | — | signaling | signaling |
| | | Y | 1 | 0 | not signaling | signaling |
| | | Y | 1 | 1 | not signaling | not signaling |
| (b) | | N | | — | signaling | signaling |
| | | Y | ChromaBTSplitModeDerivedFlag | 0 | not signaling | signaling |
| | | Y | | 1 | not signaling | not signaling |
| (c) | | N | | — | signaling | signaling |
| | | Y | ChromaQTBTDerivedFlag | 0 | signaling | signaling |
| | | Y | | 1 | not signaling | not signaling |

| | PPS Level | | | | Chroma QT SplitFlag | | Chroma BTSplitMode |
|---|---|---|---|---|---|---|---|
| (a) | | – | ChromaSplitDerivedEnableFlag | 0 | – | signaling | signaling |
| | | | | 1 | ChromaBTSplitModeDerivedEnableFlag | 0 | not signaling | signaling |
| | | | | | | 1 | not signaling | not signaling |
| (b) | | – | ChromaBTSplitModeDerivedEnableFlag | | | 0 | not signaling | signaling |
| | | | | | | 1 | not signaling | not signaling |
| (c) | | – | ChromaQTBTDerivedEnableFlag | | | 0 | signaling | signaling |
| | | | | | | 1 | not signaling | not signaling |
| (d) | BlockSize > Threshold | N | – | | | | signaling | signaling |
| | | Y | ChromaSplitDerivedEnableFlag | 0 | – | signaling | signaling |
| | | | | 1 | ChromaBTSplitModeDerivedEnableFlag | 0 | not signaling | signaling |
| | | | | | | 1 | not signaling | not signaling |
| (e) | BlockSize > Threshold | N | – | | | | signaling | signaling |
| | | Y | ChromaBTSplitModeDerivedEnableFlag | | | 0 | not signaling | signaling |
| | | | | | | 1 | not signaling | not signaling |
| (f) | BlockSize > Threshold | N | – | | | | signaling | signaling |
| | | Y | ChromaQTBTDerivedEnableFlag | | | 0 | signaling | signaling |
| | | | | | | 1 | not signaling | not signaling |

(a)

(b)

(a)

(b)

(a)

(b)

(a)

(b)

(a)

(b)

(a)

(b)

FIG. 22
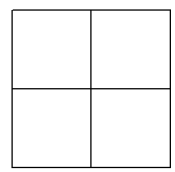
(a)
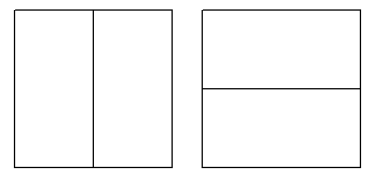
(b)
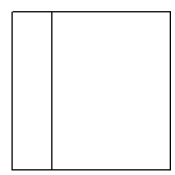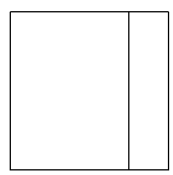
(c)
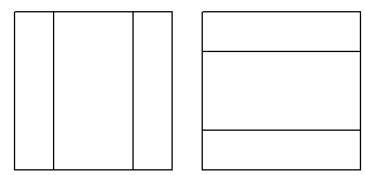
(d)

VIDEO ENCODING/DECODING METHOD AND APPARATUS, AND RECORDING MEDIUM IN WHICH BIT STREAM IS STORED

CROSS REFERENCE TO RELATED APPLICATIONS

This application is a U.S. National Stage Application of International Application No. PCT/KR2017/011722, filed on Oct. 23, 2017, which claims the benefit under 35 USC 119(a) and 365(b) of Korean Patent Application No. 10-2016-0142274, filed on Oct. 28, 2016, in the Korean Intellectual Property Office.

TECHNICAL FIELD

The present invention relates to a method and apparatus for encoding/decoding an image and a recording medium storing a bitstream. Particularly, the present invention relates to a method and apparatus for encoding/decoding an image efficiently signaling block partition information and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding/decoding an image to enhance compression efficiency.

Another object of the present invention is to provide a method and apparatus for encoding/decoding an image efficiently encoding/decoding partition information of a block.

Another object of the present invention is to provide a method and apparatus for encoding/decoding an image efficiently signaling relevant information when partition information of a first block is derivable from partition information of a second block.

Another object of the present invention is to provide a recording medium storing a bitstream generated by an image encoding method or apparatus of the present invention.

Technical Solution

An image decoding method performed by an image decoding apparatus according to the present invention may comprise decoding an indicator indicating whether or not partition information of a current block is derived from partition information of a corresponding block of the current block, obtaining the partition information of the current block based on the decoded indicator, and partitioning the current block based on the obtained partition information.

In the image decoding method of the present invention, the indicator may be signaled in a CTU level or a picture level.

In the image decoding method of the present invention, when the indicator has a first value, the partition information of the current block may be obtained from the partition information of the corresponding block, and when the indicator has a second value, the partition information of the current block may be obtained by decoding information signaled through a bitstream.

In the image decoding method of the present invention, when the partitioning of the current block includes first partitioning and second partitioning, the decoding of the indicator and the obtaining of the partition information may be respectively performed for the first partitioning and the second partitioning.

In the image decoding method of the present invention, when the partitioning of the current block includes first partitioning and second partitioning, the partition information of the current block for the first partitioning may be obtained from the partition information of the corresponding block, and the partition information of the current block for the second partitioning may be obtained by decoding an indicator for the second partitioning.

In the image decoding method of the present invention, when the partitioning of the current block includes first partitioning and second partitioning, the indicator may indicate whether or not the partition information of the current block is obtained from the partition information of the corresponding block for both the first partitioning and the second partitioning, when the indicator has a first value, the partition information of the current block may be obtained from the partition information of the corresponding block for both the first partitioning and the second partitioning, and when the indicator has a second value, the partition information of the current block may be obtained by decoding information signaled through a bitstream for both the first partitioning and the second partitioning.

In the image decoding method of the present invention, the method may further comprise comparing a size of the current block with a predetermined threshold value, and only when the size of the current block is greater than the predetermined threshold value, the decoding of the indicator may performed, and when the size of the current block is not greater than the predetermined threshold value, the partition information of the current block may be obtained by decoding information signaled through a bitstream.

In the image decoding method of the present invention, when the partitioning of the current block includes first partitioning and second partitioning, the indicator for the first partitioning and the indicator for the second partitioning may be signaled in levels different from each other.

In the image decoding method of the present invention, the partition information of the current block may include information about whether or not partitioning is performed, and information of a partition form, and when the indicator indicates that the partition information of the current block is derived from the partition information of the corresponding block, one of the information about whether or not partitioning is performed and the information of the partition form may be derived from the partition information of the corresponding block, and the remaining one may be obtained by decoding information signaled through a bitstream.

In the image decoding method of the present invention, a partition method of the current block may be determined based on at least one of a coding parameter, picture information, slice information, tile information, coding mode information, a quantization parameter (QP), a coding block flag (CBF), a block size, a block depth, a block form, an entropy encoding method, partition information of a neighbor block, and a temporal layer level.

In the image decoding method of the present invention, the current block may be a chroma block, and the corresponding block may be a luma block corresponding to the chroma block.

An image encoding method performed by an image encoding apparatus according to the present invention may comprises determining an indicator indicating whether or not partition information of a current block is derived from partition information of a corresponding block of the current block, obtaining the partition information of the current block based on the determined indicator, partitioning the current block based on the obtained partition information, and encoding at least one of the indicator and the partition information of the current block.

In the image encoding method of the present invention, when the indicator has a first value, the partition information of the current block may not be encoded, and the indicator having the first value may be encoded, and when the indicator has a second value, the indicator having the second value and the partition information of the current block may be encoded.

In the image encoding method of the present invention, when the partitioning of the current block includes first partitioning and second partitioning, the determining of the indicator, the obtaining of the partition information, and the encoding of at least one of the indicator and the partition information of the current block may be respectively performed for the first partitioning and the second partitioning.

In the image encoding method of the present invention, when the partitioning of the current block includes first partitioning and second partitioning, the partition information of the current block for the first partitioning may be obtained from the partition information of the corresponding block, and both the indicator for the first partitioning and the partition information of the current block may not be encoded, and the partition information of the current block for the second partitioning may be obtained based on the indicator for the second partitioning, and the indicator having the first value may be encoded, or both the indicator having the second value and the partition information of the current block may be encoded.

In the image encoding method of the present invention, when the partitioning of the current block includes first partitioning and second partitioning, the indicator may indicate whether or not the partition information of the current block for both the first partitioning and the second partitioning is derived from the partition information of the corresponding block, when the indicator has a first value, the partition information of the current block may not be encoded and the indicator having the first value may be encoded for both the first partitioning and the second partitioning, and when the indicator has a second value, the indicator having the second value and the partition information of the current block may be encoded for both the first partitioning and the second partitioning.

In the image encoding method of the present invention, the method may further comprise comparing a size of the current block with a predetermined threshold value, and only when the size of the current block is greater than the predetermined threshold value, the determining of the indicator and the encoding of the indicator may be performed, and when the size of the current block is not greater than the predetermined threshold value, the partition information of the current block may be encoded.

A recording medium according to the present invention may store a bitstream generated by an image encoding method.

Advantageous Effects

According to the present invention, a method and apparatus for encoding/decoding an image to enhance compression efficiency may be provided.

According to the present invention, a method and apparatus for encoding/decoding an image efficiently encoding/decoding partition information of a block may be provided.

According to the present invention, a method and apparatus for encoding/decoding an image efficiently signaling relevant information when partition information of a first block is derivable from partition information of a second block may be provided.

According to the present invention, a recording medium storing a bitstream generated by an image encoding method or apparatus of the present invention may be provided.

DESCRIPTION OF DRAWINGS

FIG. 7 is a view for illustrating deriving of block partition information in a CTU level.

FIG. 11 is a view for illustrating deriving of block partition information in a CU level.

FIG. 15 is a view for illustrating deriving of block partition information in a PPS level.

FIG. 22 is a view showing various types of block partitioning.

MODE FOR CARRYING OUT THE INVENTION

Figure 1:
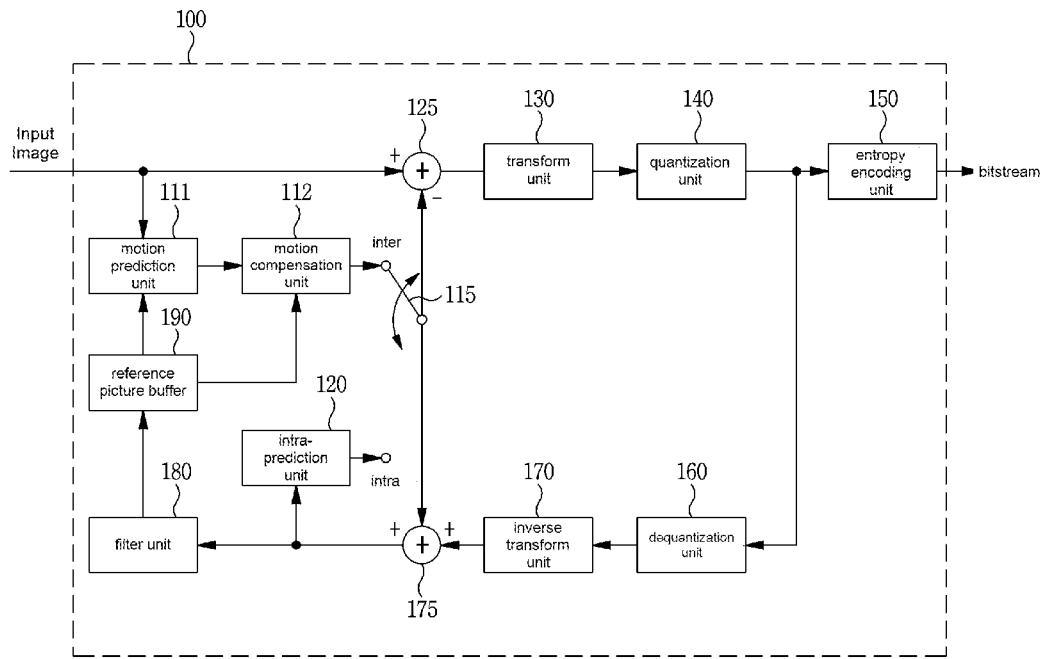
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of Terms

Encoder: means an apparatus performing encoding.

Decoder: means an apparatus performing decoding

Block: is an MxN array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel.

Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block.

Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Reference Picture List: means a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Reference Picture Index: means an index indicating a specific reference picture in a reference picture list.

Reference Picture: may mean a picture to which a specific block refers for inter-picture prediction or motion compensation.

Motion Vector: is a two-dimensional vector used for inter-picture prediction or motion compensation and may mean an offset between a reference picture and an encoding/ decoding target picture. For example, (mvX, mvY) may represent a motion vector, mvX may represent a horizontal component, and mvY may represent a vertical component.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list of motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: means a list composed of merge candidates.

Merge Candidate: means a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: means information indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: means a basic unit used when encoding or decoding a residual signal, for example, when performing transform, reverse transform, quantization, dequantization, or transform coefficient encoding/decoding. One transform unit may be partitioned into a plurality of smaller transform units.

Scaling: means a process of multiplying a transform coefficient level by a factor. A transform coefficient may be generated by scaling a transform coefficient level. The scaling also may be referred to as dequantization.

Quantization Parameter: may mean a value used when generating a transform coefficient level of a transform coefficient during quantization. The quantization parameter also may mean a value used when generating a transform coefficient by scaling a transform coefficient level during dequantization. The quantization parameter may be a value mapped on a quantization step size.

Delta Quantization Parameter: means a difference value between a predicted quantization parameter and a quantization parameter of an encoding/decoding target unit.

Scan: means a method of sequencing coefficients within a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: means a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: means a transform coefficient having a value other than zero, or a transform coefficient level having a value other than zero.

Quantization Matrix: means a matrix used in a quantization process or a dequantization process performed to improve subjective or objective image quality. The quantization matrix also may be referred to as a scaling list.

Quantization Matrix Coefficient: means each element within a quantization matrix. The quantization matrix coefficient also may be referred to as a matrix coefficient.

Default Matrix: means a predetermined quantization matrix preliminarily defined in an encoder or a decoder.

Non-default Matrix: means a quantization matrix that is not preliminarily defined in an encoder or a decoder but is signaled by a user.

FIG. 1 is a block diagram illustrating the construction of an encoding apparatus according to one embodiment of the present invention.

An encoding apparatus 100 may be an encoder, a video encoding apparatus, or an image encoding apparatus. A video may include one or more images (or pictures). The encoding apparatus 100 can sequentially encode one or more pictures.

With reference to FIG. 1, the encoding apparatus 100 includes a motion prediction unit 111, a motion compensation unit 112, an intra-prediction unit 120, a switch 115, a subtractor 125, a transform unit 130, a quantization unit 140, an entropy encoding unit 150, a dequantization unit 160, a reverse-transform unit 170, an adder 175, a filter unit 180, and a reference picture buffer 190.

The encoding apparatus 100 can perform encoding on an input picture using an intra mode and/or an inter mode. The encoding apparatus 100 may generate a bitstream by encoding an input picture and output the generated bitstream. The generated bitstream may be recorded on a computer-readable recording medium or streamed via a wired or wireless transmission medium. When an intra mode is used as a prediction mode, the switch 115 may be switched to intra. Meanwhile, when an inter mode is used as a prediction mode, the switch 115 may be switched to inter. Here, the intra mode may mean an intra-picture prediction mode, and the inter mode may mean an inter-picture prediction mode. The encoding apparatus 100 may generate a prediction block of an input block of an input picture. After the prediction block is generated, the encoding apparatus 100 may encode a residual between the input block and the prediction block. The input picture can be referred to as a current picture that is an encoding target picture to undergo current encoding. The input block can be referred to as a current block or an encoding target block to undergo current encoding.

When the prediction mode is the intra mode, the intra-prediction unit 120 may use a pixel value of a neighboring block that has been already encoded or decoded as a reference pixel. The intra-prediction unit 120 may perform spatial prediction on the input block by using the reference pixel, and generate prediction samples of the input block through the spatial prediction. Here, the intra-prediction may mean intra-picture prediction.

When the prediction mode is the inter mode, the motion prediction unit 111 may search a reference picture for a region that best matches the input block during a motion prediction process, and derive a motion vector using the searched region. The reference picture may be stored in the reference picture buffer 190.

The motion compensation unit 112 may generate a prediction block by performing motion compensation using a motion vector. Here, the inter-prediction may mean inter-picture prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), an intra-prediction mode/direction, a reference sample filtering method, a prediction block filtering method, a prediction block filter tap, a prediction block filter coefficient, an inter-prediction mode, motion information, a motion vector, a reference picture index, a inter-prediction angle, an inter-prediction indicator, a reference picture list, a reference picture, a motion vector predictor candidate, a motion vector candidate list, whether to use a merge mode, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag(CBF), a quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a luma signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
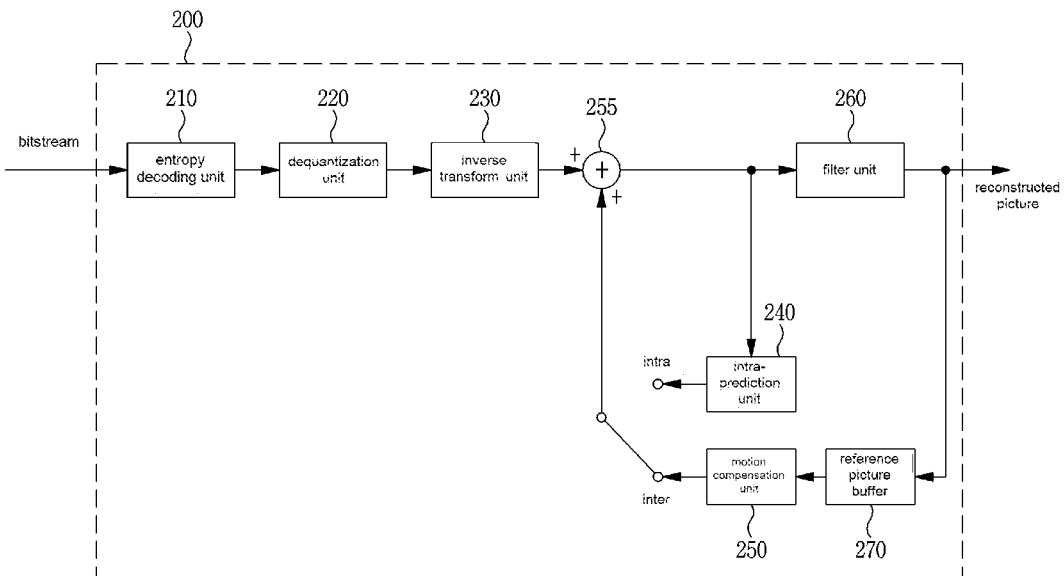
FIG. 2 is a block diagram showing configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing spatial prediction that uses a pixel value of a block adjacent to a decoding target block and which has been already decoded.

When the inter mode is used, the motion compensation unit 250 may generate a prediction block by performing motion compensation using both the motion vector and the reference picture stored in the reference picture buffer 270. When the value of the motion vector is not an integer, the motion compensation unit 250 may generate the prediction block by applying the interpolation filter to a partial region of a reference picture. In order to perform motion compensation on a coding unit, it may be first determined that which mode among a skip mode, a merge mode, an AMVP mode, and a current picture reference mode is to be used for motion compensation of a prediction unit included in the corresponding coding unit, and the motion compensation may then be performed according to the determined mode.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
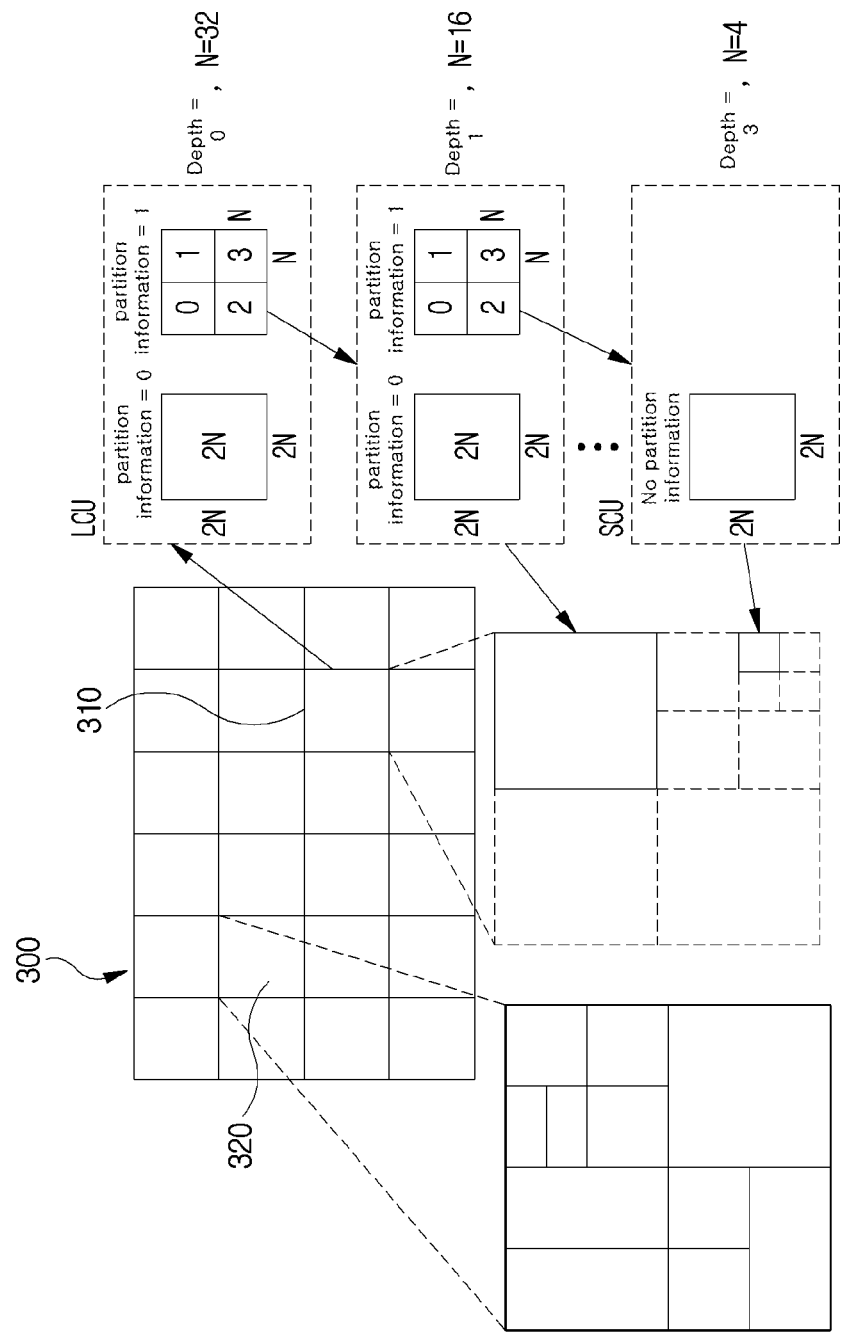
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned in a layer associated with depth information based on a tree structure. Each of partitioned lower unit may have depth information. Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form are applied.

Figure 4:
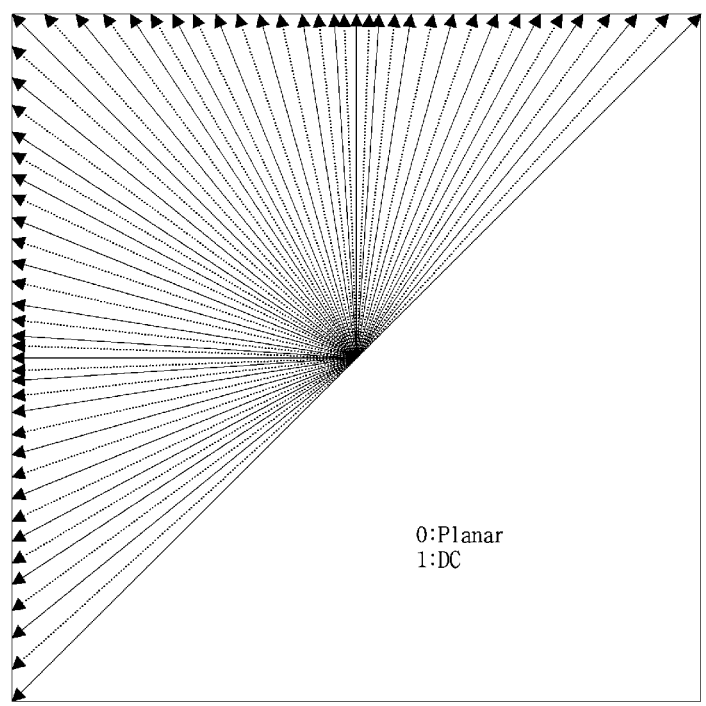
FIG. 4 is a view for explaining an embodiment of a process of intra prediction.

FIG. 4 is a view showing an intra-prediction process.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, and a mode angle. A number of intra-prediction modes may be M including 1, and the non-angular and the angular mode.

A number of intra-prediction modes may be fixed to N regardless of a block size. Alternatively, a number of intra-prediction modes may vary according to a block size or a color component type or both. For example, as a block size becomes large, a number of intra-prediction modes may increase. Alternatively, a number of intra-prediction modes of a luma component block may be larger than a number of intra-prediction modes of a chroma component block.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
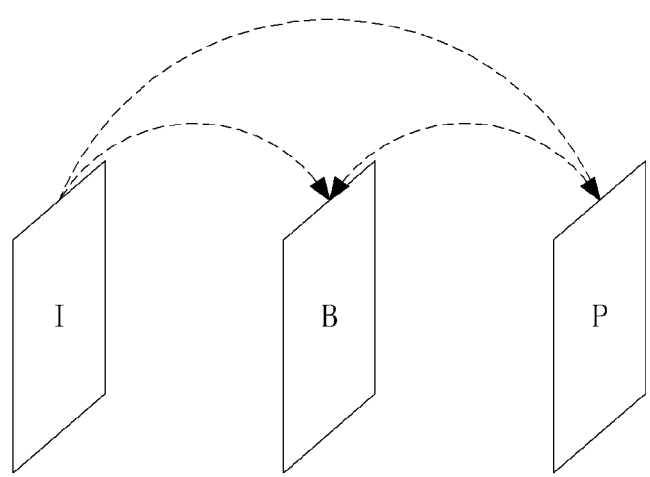
FIG. 5 is a view for explaining an embodiment of a process of inter prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
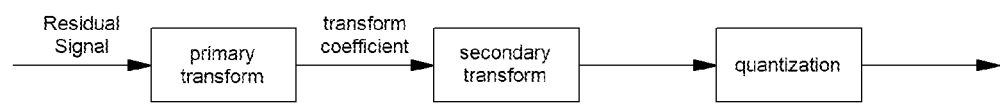
FIG. 6 is a view for explaining a process of transformation and quantization.

FIG. 6 is a view for explaining a process of transform and quantization.

As shown in FIG. 6, a quantized level may be generated by performing transform and/or quantization process to a residual signal. The residual signal may be generated as a difference between an original block and a prediction block (intra prediction block or inter prediction block). Here, the transform may include at least one among a primary transform and a secondary transform. A transform coefficient may be generated by performing the primary transform to the residual signal. A secondary transform coefficient may be generated by performing the secondary transform to the transform coefficient.

The primary transform may be performed by using at least one among a plurality of predefined transform methods. For example, the plurality of predefined transform methods may comprise DCT(DCT(Discrete Cosine Transform), DST(Discrete Sine Transform) or KLT(Karhunen-Loeve Transform) based transform, etc. The secondary transform may be performed on a transform coefficient generated after performing the primary transform. The transform method applied for the primary transform and/or the secondary transform may be determined according to at least one among coding parameters of the current block and/or a neighbor block. Alternatively, transform information indicating a transform method may be signaled.

A quantized level may be generated by performing quantization on the result of performing the primary transform and/or the secondary transform or a residual signal. The quantized level may be scanned according to at least one among up-right diagonal scan, vertical scan and horizontal scan based on at least one among an intra prediction mode, a size/shape of a block. For example, coefficients of a block may be changed into a one-dimensional vector form by scanning the coefficients using up-right diagonal scan. A vertical scan which scans coefficients of two-dimensional block form in a column direction or a horizontal scan which scans coefficients of two-dimensional block form in a row direction may be used based on a transform block size and/or intra prediction mode instead of the up-right diagonal scan. The scanned quantization level may be included in a bitstream after being entropy encoded.

A decoder may generate a quantized level by entropy decoding a bitstream. the quantized level may be inverse scanned and arranged into a two dimensional block form. Here, at least one among up-right diagonal scan, vertical scan and horizontal scan may be performed as an inverse scanning method.

The quantized level may be inverse quantized. A secondary inverse transform may be performed according to whether to perform the secondary inverse transform. A reconstructed residual signal may be generated by performing a primary inverse transform on the result of performing the secondary inverse transform according to whether to perform the primary inverse transform.

Hereinafter, a block partition method and apparatus according to the present invention will be described.

In order to partition a current block, partition information of the current block may be derived. Partition information of a block may be derived by a method and apparatus including at least one of deriving in a coding tree unit level, deriving in a coding unit level, and deriving in a picture parameter set (PPS) level. Herein, the current block may mean a luma block or a chroma block. Any one of the luma block or the chroma block may be independently partitioned from the other one. Alternatively, any one of the two blocks may be partitioned by dependently referencing partition information of the other one. For example, when the current block is a chroma block, information of a corresponding luma block may be referenced. Alternatively, when the current block is a luma block, information of a corresponding chroma block may be referenced. Hereinafter, the current block that becomes a partition target may be a chroma block.

In deriving in a CTU level, information indicating whether or not each of quad-tree (QT) partitioning and binary-tree (BT) partitioning of a chroma block is identical to a corresponding luma block may be used. Alternatively, the QT partitioning of the chroma block may be identical to the corresponding luma block, and the BT partitioning of the chroma block may be selectively identical to or different from the corresponding luma block. Information (for example, indicator such as flag, etc.) may be signaled for this. Alternatively, both the QT partitioning and the BT partitioning of the chroma block may be identical to or different from the corresponding luma block, and information indicating the above may be signaled.

In deriving in a CU level, according to a block size or form or both, information indicating whether or not each of QT partitioning and BT partitioning of a chroma block is identical to a corresponding luma block may be used. Alternatively, according to a block size or form or both, information indicating that QT partitioning of the chroma block is identical to the corresponding luma block, and indicating whether or not BT partitioning of the chroma block is selectively identical to or different from the corresponding luma block may be used. Alternatively, according to a block size or form or both, information indicating whether or not both QT partitioning and BT partitioning of the chroma block are identical to the corresponding luma block may be used.

In deriving in a PPS level, information that may be used in the deriving in a CTU level and the deriving in a CU level may be signaled in a PPS level. Herein, a chroma block may be partitioned based on information signaled in a PPS level for a CU belonging to a specific picture referencing the corresponding PPS.

Hereinafter, deriving in a coding tree unit (CTU) level will be described with reference to FIG. 7 to FIG. 10.

A chroma block for a CU belonging to a CTU may be identically partitioned with a corresponding luma block, or may be partially identically partitioned with a corresponding luma block. Alternatively, the chroma block may be independently partitioned with regardless of the luma block.

Information about a relation between partitioning of a chroma block and partitioning of a corresponding luma block may be signaled in a CTU level. For example, at least one of an indicator indicating that partition information of a chroma block for a CU belonging to a corresponding CTU is derived from partition information of a corresponding luma block, an indicator indicating that the chroma block is identically partitioned with the corresponding luma block, an indicator indicating that the chroma block is partially identically partitioned with the corresponding luma block, an indicator indicating which partitioning (for example, QT partitioning or BT partitioning) for the chroma block is identical to partitioning for the luma block, and an indicator indicating that the chroma block is partitioned with regardless of the corresponding luma block may be signaled in a CTU level.

The chroma block or the luma block may be at least one of a coding tree block, a coding block, a prediction block, a transform block, and a block having a predetermined size.

FIG. 7 is a view for illustrating deriving of block partition information in a CTU level. In FIG. 7, each of (a), (b), and (c) may correspond to an example of signaling partition information of a chroma block in a CTU level.

In FIG. 7, ChromaSplitDerivedFlag may be information indicating whether or not QT partition information of a chroma block may be derived from QT partition information of a corresponding luma block. In the present description, QT partition information of a block may be information indicating whether or not a corresponding block may be partitioned in a quad-tree.

ChromaBTSplitModeDerivedFlag may be information indicating whether or not BT partition information of a chroma block is derived from BT partition information of a corresponding luma block. In the present description, BT partition information of a block may be information of at least one of whether or not a corresponding block is partitioned in a binary-tree, a direction (horizontal partitioning or vertical partitioning) of BT partitioning, whether or not asymmetric partitioning is, and a ratio of asymmetric partitioning.

ChromaQTBTDerivedFlag may be information indicating whether or not at least one of QT partition information and BT partition information of a chroma block is derived from at least one of QT partition information and BT partition information of a corresponding luma block.

QTSplitFlag may be QT partition information of a current CU in a CU level. ChromaQTSplitFlag may be QT partition information of a chroma block.

BTSplitMode may be BT partition information of a current CU in a CU level. ChromaBTSplitMode may be BT partition information of a chroma block.

QTBT may be a meaning indicating both QT and BT.

Describing an example (a) shown in FIG. 7, partition information of a chroma block may be derived based on at least one of an indicator indicating whether or not QT partition information of a corresponding luma block is used, and an indicator indicating whether or not BT partition information of the corresponding luma block is used.

In detail, when the indicator indicating whether or not QT partition information of the corresponding luma block is used (for example, ChromaSplitDerivedFlag) is 0, partition information of the chroma block may not be derived from partition information of the corresponding luma block. Herein, partition information of the chroma block (for example, ChromaQTSplitFlag or ChromaBTSplitMode or both) may be signaled in a CU level. In other words, the encoder may signal partition information of a chroma block for a CU belonging to a CTU in a CU level, and the decoder may partition the chroma block based on the signaled information.

For example, when ChromaSplitDerivedFlag is 1, an indicator indicating whether or not BT partition information of a corresponding luma block (for example, ChromaBTSplitModeDerivedFlag) may be additionally signaled. When ChromaBTSplitModeDerivedFlag is 0, BT partition information of a chroma block for a CU belonging to a CTU may not be derived from BT partition information of a corresponding luma block. Herein, BT partition information of the chroma block may be signaled in a CU level. In addition, QT partition information of the chroma block may be derived from QT partition information of the corresponding luma block. In other words, the encoder may not signal QT partition information of the chroma block for a CU belonging to a CTU in a CU level, and the decoder may identically partition the chroma block with QT partitioning of the corresponding luma block.

For example, when ChromaSplitDerivedFlag is 1 and ChromaBTSplitModeDerivedFlag is 1, QT partition information and BT partition information of a chroma block for a CU belonging to a CTU may be derived from QT partition information and BT partition information of a corresponding luma block. Herein, the encoder may not signal QT partition information and BT partition information of the chroma block for a CU belonging to a CTU, and the decoder may identically partition the chroma block with QT and BT partitioning of the corresponding luma block.

FIG. 8 is a view illustrating operations corresponding to the example (a) shown in FIG. 7. FIG. 8(*a*) shows operations of the encoder, and FIG. 8(*b*) shows operations of the decoder.

In the encoder, as shown in FIG. 8(*a*), first, in step S801, a chroma block that is a partition target block may be specified. Then, in step S802, a ChromaSplitDerivedFlag value for a current CTU may be determined. When ChromaSplitDerivedFlag is false, in order to determine an optimized QTBT partition form for the chroma block, in step S803, rate distortion optimization (RDO) may be performed. Then, in step S804, at least one of ChromaSplitDerivedFlag having a value being false, QT partition information (Chroma SplitFlag) of the chroma block, and BT partition information (Chroma BTSplitMode) of the chroma block may be encoded.

Figure 8A:
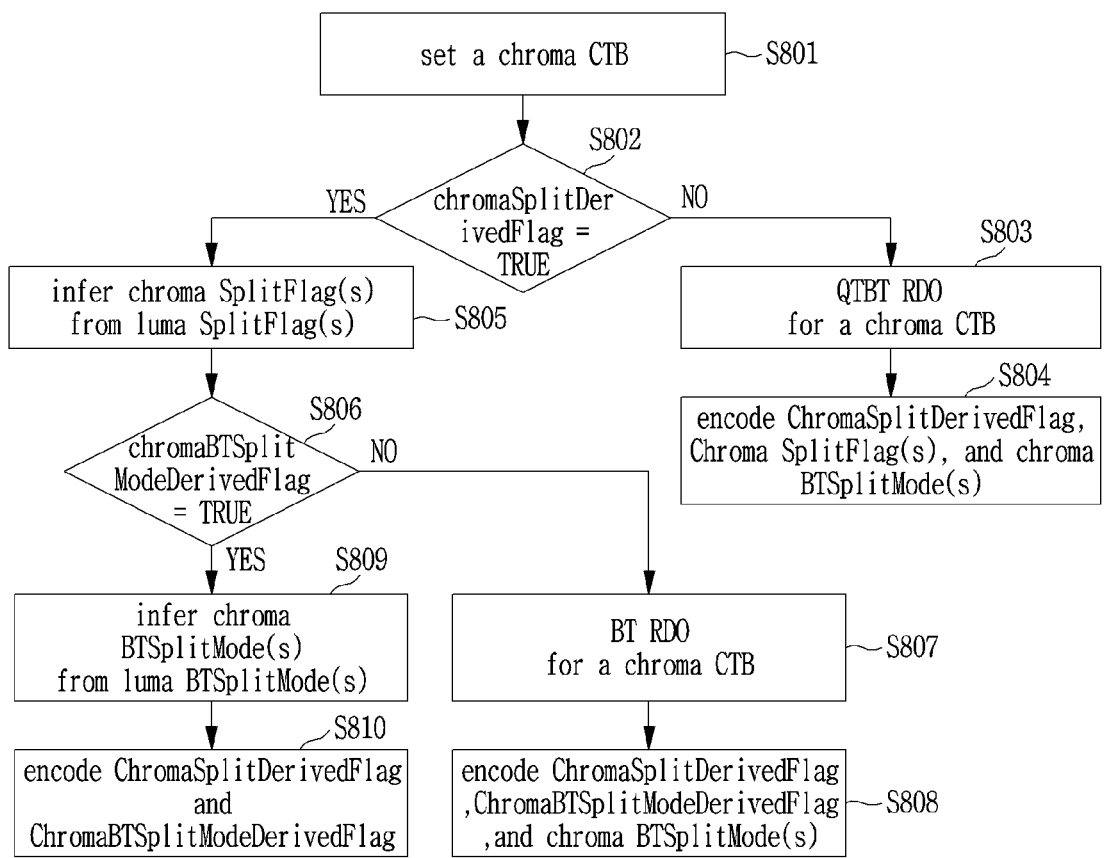
FIG. 8 is a view illustrating operations corresponding to the example (a) shown in FIG. 7.
Figure 8B:
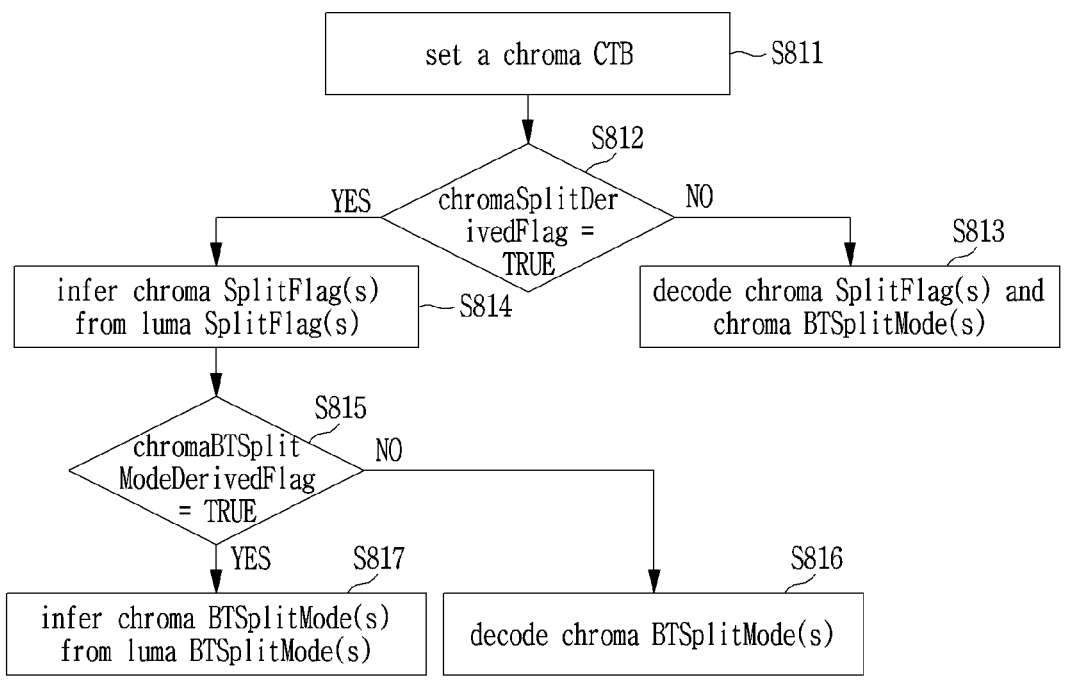

When ChromaSplitDerivedFlag is true in step S802, QT partition information of the chroma block may be derived from QT partition information of a corresponding luma block in step S805. Then, in order to determine whether or not BT partition information of the chroma block is derived from BT partition information of the corresponding luma block, in step S806, a ChromaBTSplitModeDerivedFlag value may be determined. When ChromaBTSplitModeDerivedFlag is false, in order to determine an optimized BT partition form for the chroma block, in step S807, rate distortion optimization may be performed. After, in step S808, ChromaSplitDerivedFlag having a value being true, and ChromaBTSplitModeDerivedFlag having a value being false and the BT partition information of the chroma block may be encoded When ChromaBTSplitModeDerivedFlag is true in step S806, BT partition information of the chroma block may be derived from BT partition information of the corresponding luma block in step S809. Then, in step S810, ChromaSplitDerivedFlag and ChromaBTSplitModeDerivedFlag which have values being true may be encoded In the decoder, as shown in FIG. 8(b), first, in step S811, a chroma block that becomes a partition target block may be specified. Then, in step S812, a ChromaSplitDerivedFlag value that is signaled in a CTU level may be determined. When ChromaSplitDerivedFlag is false, in step S813, QT partition information of the chroma block or BT partition information of the chroma block or both may be decoded from a bitstream.

When ChromaSplitDerivedFlag is true, in step S814, QT partition information of the chroma block may be derived from QT partition information of the corresponding luma block. Then, in step S815, a ChromaBTSplitModeDerivedFlag value may be determined. When ChromaBTSplitModeDerivedFlag is false, in step S816, BT partition information of the chroma block may be decoded from a bitstream. When ChromaBTSplitModeDerivedFlag is true in step S815, BT partition information of the chroma block may be derived from BT partition information of the corresponding luma block in step S817. The decoder may partition the chroma block based on partition information derived or decoded from at least one of steps S813, S814, S816, and S817.

Describing another example (b) of the present invention by referencing again FIG. 7, it may be set that QT partition information of a chroma block is derived from QT partition information of a corresponding luma block. The above setting may be performed by using information signaled in a CTU level or a level higher than the CTU. The higher level may be at least one level of a video, a sequence, a picture, a slice, and a tile. Alternatively, without signaling additional information, it may be set as a default for the encoder and the decoder to derive QT partition information of the chroma block from QT partition information of the corresponding luma block.

When QT partition information of the chroma block is derived from QT partition information of the corresponding luma block, QT partition information of the chroma block for a CU belonging to a CTU may not be signaled. Herein, an indicator indicating whether or not BT partition information of the corresponding luma block is used (for example, ChromaBTSplitModeDerivedFlag) may be signaled.

When ChromaBTSplitModeDerivedFlag is 0, BT partition information of the chroma block for the CU belonging to the CTU may not be derived from BT partition information of the corresponding luma block. Herein, BT partition information of the chroma block may be signaled in a CU level.

When ChromaBTSplitModeDerivedFlag is 1, BT partition information of the chroma block for the CU belonging to the CTU may be derived from BT partition information of the corresponding luma block. Herein, the encoder may not signal QT partition information and BT partition information of the chroma block for the CU belonging to the CTU, and the decoder may identically partition the chroma block with QT partitioning and BT partitioning of the corresponding luma block.

Figure 9A:
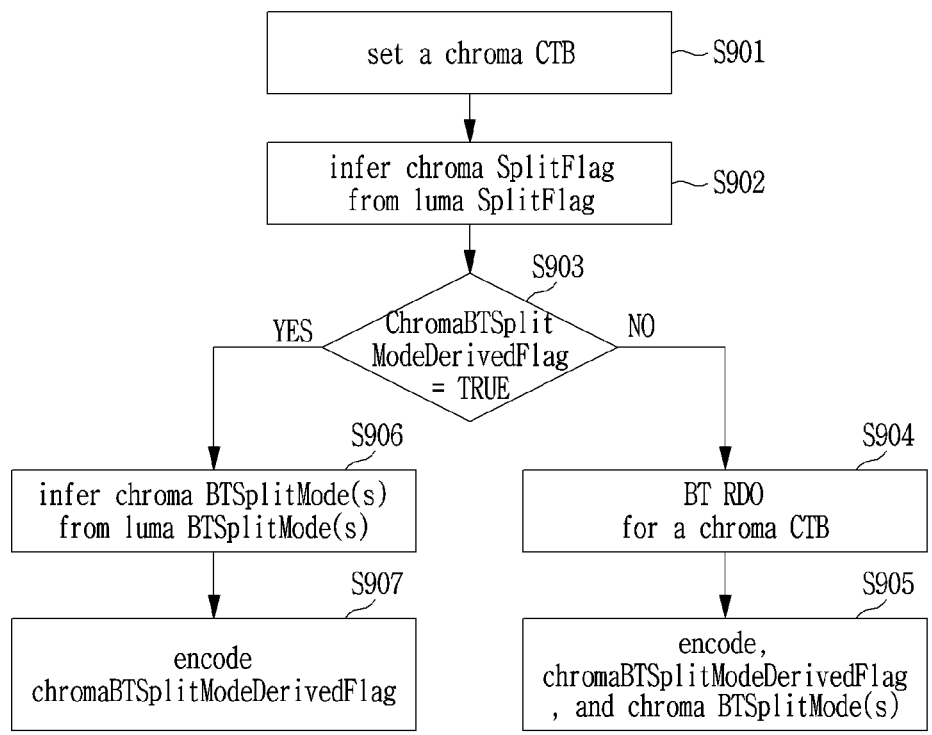
FIG. 9 is a view illustrating operations corresponding to the example (b) shown in FIG. 7.
Figure 9B:
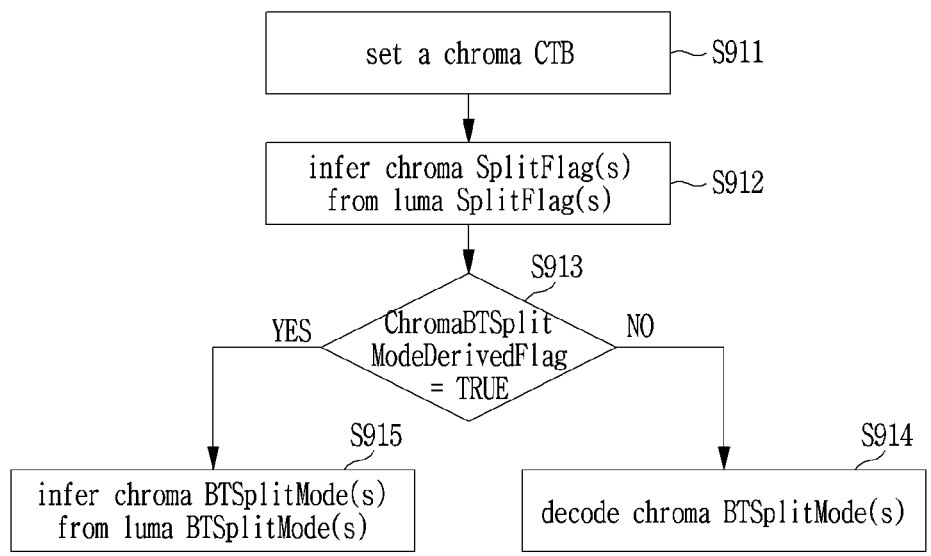

FIG. 9 is a view illustrating operations corresponding to the example (b) shown in FIG. 7. FIG. 9(a) shows operations of the encoder, and FIG. 9(b) shows operations of the decoder.

In the encoder, as shown in FIG. 9(a), first, in step S901, a chroma block that becomes a partition target block may be specified. In step S902, QT partition information of the chroma block may be derived from QT partition information of a corresponding luma block. Then, in order to determine whether or not BT partition information of the chroma block is derived from BT partition information of the corresponding luma block, in step S903, a ChromaBTSplitModeDerivedFlag value may be determined. When ChromaBTSplitModeDerivedFlag is false, in order to determine an optimized BT partition form for the chroma block, rate distortion optimization may be performed in step S904. Then, in step S905, ChromaBTSplitModeDerivedFlag having a value being false, and BT partition information of the chroma block may be encoded.

When ChromaBTSplitModeDerivedFlag is true in step S903, BT partition information of the chroma block may be derived from BT partition information of the corresponding luma block in step S906. Then, in step S907, ChromaBTSplitModeDerivedFlag having a value being true may be encoded.

In the decoder, as shown in FIG. 9(b), first, in step S911, a chroma block that becomes a partition target block may be specified. In step S912, QT partition information of the chroma block may be derived from QT partition information of the corresponding luma block. Then, in step S913, a ChromaBTSplitModeDerivedFlag value may be determined. When ChromaBTSplitModeDerivedFlag is false, in step S914, BT partition information of the chroma block may be decoded from a bitstream. When ChromaBTSplitModeDerivedFlag is true in step S913, BT partition information of the chroma block may be derived from BT partition information of the corresponding luma block in step S915. The decoder may partition the chroma block based on partition information derived or decoded from at least one of step S912, step S914, and step S915.

Describing an example (c) of the present invention by referencing aging FIG. 7, according to an indicator indicating whether or not partition information of a corresponding luma block is used, at least one of QT block partition information and BT block partition information of a chroma block may be derived from at least one of QT block partition information and BT block partition information of a corresponding luma block.

For example, when the indicator indicating whether or not the partition information of the corresponding luma block (for example, ChromaQTBTDerivedFlag) is used is 0, at least one of QT partition information and BT partition information of the chroma block for a CU belonging to a CTU may not be derived from at least one of QT partition information and BT partition information of the corresponding luma block. Herein, QT partition information or BT partition information or both of the chroma block which is not derived may be signaled in a CU level. In other words, the encoder may signal the QT partition information or the BT partition information or both of the chroma block for the CU belonging to the CTU in a CU level, and the decoder may partition the chroma block based on the signaled information.

For example, when ChromaQTBTDerivedFlag is 1, at least one of QT partition information and BT partition information of the chroma block for the CU belonging to the CTU may be derived from at least one of QT partition information and BT partition information of the corresponding luma block. Herein, the encoder may not signal QT partition information or BT partition information or both of the chroma block for the CU belonging to the CTU, and the decoder may identically partition the chroma block with QT partitioning or BT partitioning or both of the corresponding luma block.

Figure 10A:
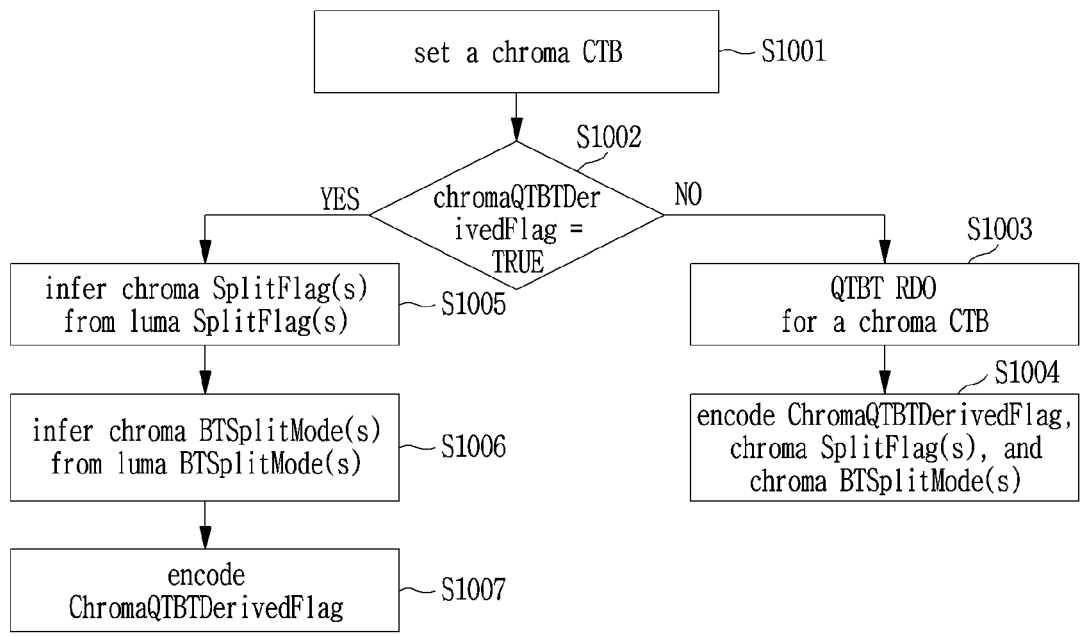
FIG. 10 is a view for illustrating operations corresponding to the example (c) shown in FIG. 7.
Figure 10B:
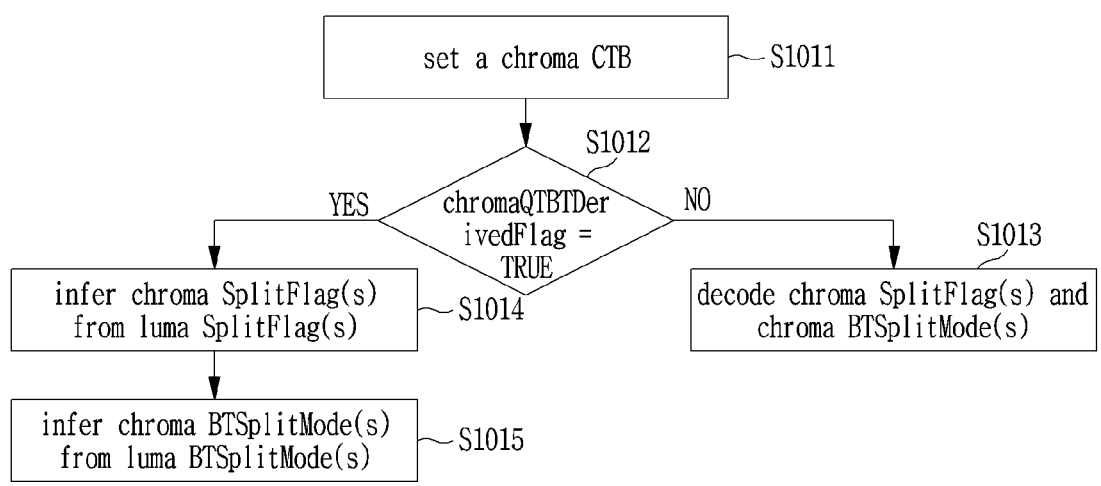

FIG. 10 is a view for illustrating operations corresponding to the example (c) shown in FIG. 7. FIG. 10(a) shows operations of the encoder, and FIG. 10(b) shows operations of the decoder.

In the encoder, as shown in FIG. 10(a), first, in step S1001, a chroma block that becomes a partition target block may be specified. Then, in order to determine whether or not QTBT partition information of the chroma block is derived from QTBT partition information of a corresponding luma block, in step S1002, a ChromaQTBTDerivedFlag value may be determined. When ChromaQTBTDerivedFlag is false, in order to determine an optimized QTBT partition form for the chroma block, in step S1003, rate distortion optimization may be performed. Then, in step S1004, at least one of ChromaQTBTDerivedFlag having a value being false, QT partition information of the chroma block, and BT partition information of the chroma block may be encoded. When ChromaQTBTDerivedFlag is true in step S1002, QT partition information and BT partition information of the chroma block may be respectively derived from QT partition information and BT partition information of the corresponding luma block in steps S1005 and S1006. Then, in step S1007, ChromaQTBTDerivedFlag having a value being true may be encoded.

In the decoder, as shown in FIG. 10(b), first, in step S1011, a chroma block that becomes a partition target block may be specified. Then, in step S1012, a ChromaQTBTDerivedFlag value may be determined. When ChromaQTBTDerivedFlag is false, in step S1013, QT partition information or BT partition information or both of the chroma block may be decoded from a bitstream. When ChromaQTBTDerivedFlag is true in step S1012, QT partition information or BT partition information or both of the chroma block may be derived from QT partition information or BT partition information or both of the corresponding luma block in steps S1014 and S1015. The decoder may partition the chroma block based on partition information derived or decoded from at least one of step S1013, step S1014, and step S1015.

Hereinafter, deriving in a coding unit (CU) level will be described with reference to FIG. 11 to FIG. 14.

Whether or not partition information of a chroma block is derived from partition information of a corresponding luma block may be determined based on a block size of a CU belonging to a CTU. Herein, the block size may mean a size of a chroma block. In addition, as described above, partitioning of a chroma block and partitioning of a luma block may be identical, may be partially identical, or may be independently determined.

For example, a block size may be compared with an arbitrary threshold value. The threshold value may be a value preset in the encoder/decoder. Alternatively, it may be signaled in at least one level of a video, a sequence, a picture, a slice, a tile, and a CTU.

Information about a relation between partitioning of the chroma block and partitioning of the corresponding luma block may be signaled in a CTU level. Information that may be signaled in a CTU level is the same as the deriving in the CTU level described with reference to FIG. 7. In addition, the block may be at least one of a coding tree block, a coding block, a prediction block, a transform block, and a block having a predetermined size.

FIG. 11 is a view for illustrating deriving of block partition information in a CU level. In FIG. 11, each of (a), (b), and (c) may correspond to an example of signaling partition information of a block in a CTU level for deriving block partition information.

Terms identically used in FIG. 7 and FIG. 11 among used terms may have identical meanings.

In the example described with reference to FIG. 11, partition information of a chroma block may be derived based on at least one of a block size of a CU, an indicator indicating whether or not QT partition information of a corresponding luma block is used, and an indicator indicating whether or not BT partition information of a corresponding luma block is used.

In addition, in the example described with reference to FIG. 11, when a size of a chroma block is smaller than a predetermined threshold value, partition information of the chroma block may not be derived from partition information of a corresponding luma block, and may be signaled in a CU level. Herein, the encoder may signal QT partition information or BT partition information or both of the chroma block for a CU in which the size of the chroma block is smaller than a threshold value in a CU level, and the decoder may partition the chroma block based on information signaled for the CU in which the size of the chroma block is smaller than the threshold value.

In FIG. 11, when a size of the chroma block is greater than a predetermined threshold value, partition information of the chroma block may be obtained according to the example described with reference to FIG. 7. In other words, among CUs belonging to a CTU, for a CU in which a size of the chroma block is greater than a predetermined threshold value, QT partition information or BT partition information or both of the chroma block may be signaled or derived according to the example described with reference to FIG. 7. Herein, the encoder may signal or may not signal in CU level QT partition information or BT partition information or both of the chroma block for a CU in which the size of the chroma block is greater than the threshold value among CUs belonging to a CTU, and the decoder may partition the chroma block based on information signaled for the CU in which the size of the chroma block is greater than the threshold value among CUs belonging to the CTU, or based on information derived from the corresponding luma block.

Figure 12A:
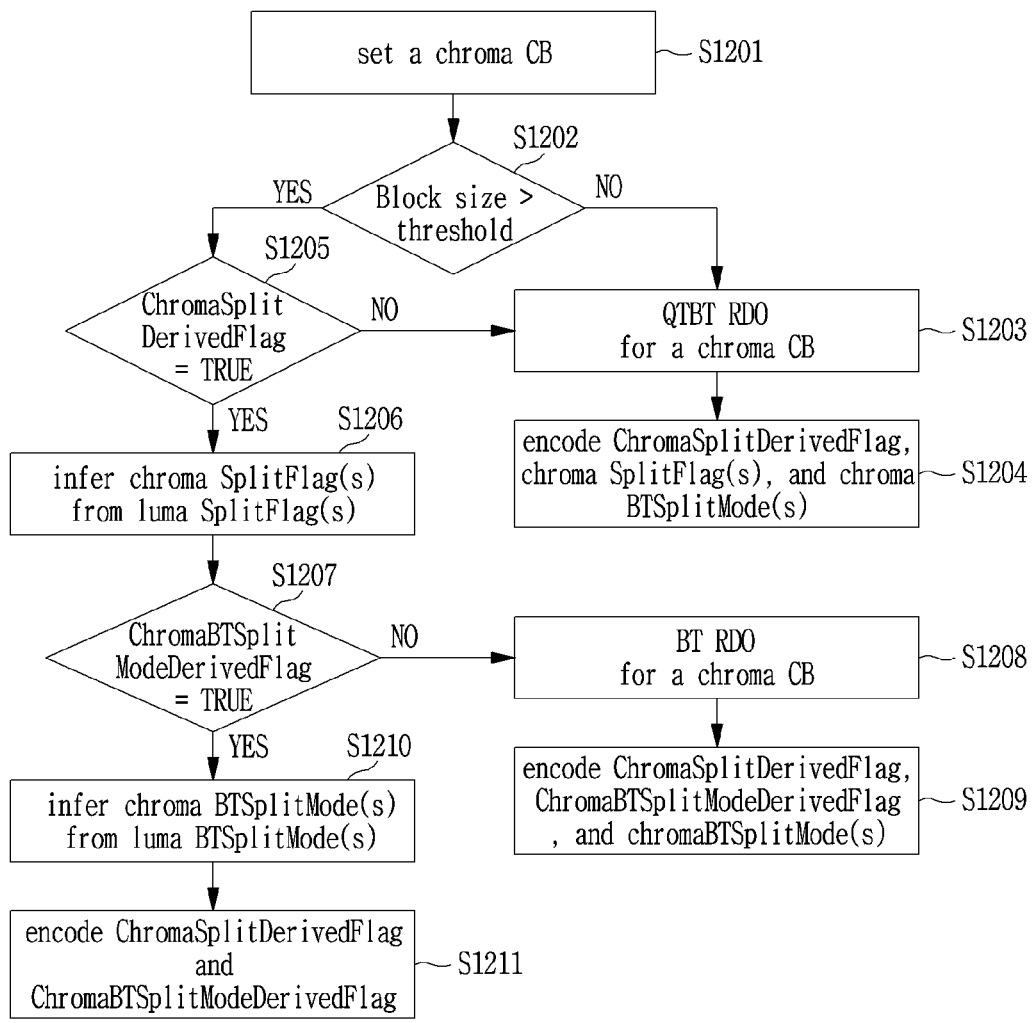
FIG. 12 is a view for illustrating operations corresponding to the example (a) shown in FIG. 11.
Figure 12B:
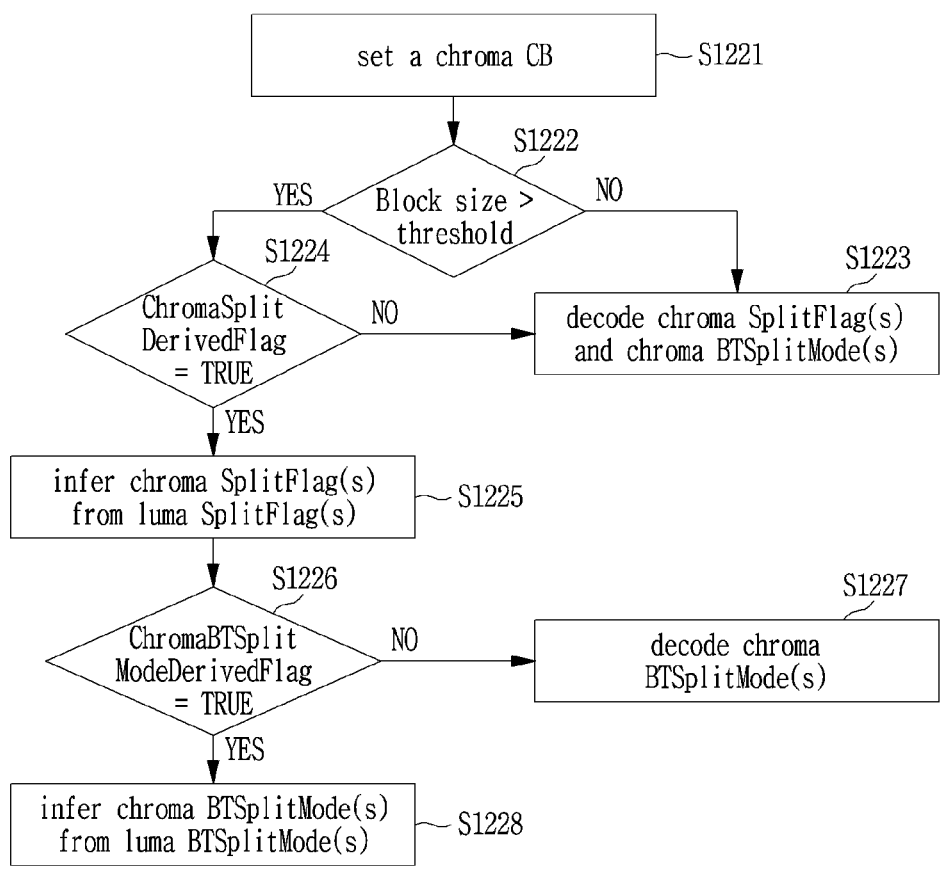

FIG. 12 is a view for illustrating operations corresponding to the example (a) shown in FIG. 11. FIG. 12(a) shows operations of the encoder, and FIG. 12(b) shows operations of the decoder.

In the encoder, as shown in FIG. 12(a), first, in step S1201, a chroma block that becomes a partition target block may be specified. Then, in step S1202, a block size may be compared with a predetermined threshold value. When the block size is not greater than the threshold value, in order to determine an optimized QTBT partition form for the chroma block, in step S1203, rate distortion optimization may be performed. Then, in step S1204, at least one of ChromaSplitDerivedFlag having a value being false, QT partition information of the chroma block, and BT partition information of the chroma block may be encoded. When the block size is greater than the threshold value in step S1202, steps S1203 to S1211 may be performed, and the above steps may substantially respectively correspond to steps S802 to 810 of FIG. 8(a). In other words, in FIG. 12(a), when the block size is greater than the threshold value, operations of the encoder are the same as described in FIG. 8(a). Accordingly, descriptions of overlapped operations will be omitted.

In the decoder, as shown in FIG. 12(b), first, in step S1221, a chroma block that becomes a partition target block may be specified. Then, in step S1222, a block size may be compared with a predetermined threshold value. When the block size is not greater than the threshold value, in step S1223, QT partition information or BT partition information or both of the chroma block may be decoded from a bitstream.

When the block size is greater than the threshold value in step S1222, steps S1223 to S1228 may be performed, and the above steps may substantially respectively correspond to steps S812 to S817 of FIG. 8(b). In other words, in FIG. 12(b), when the block size is greater than the threshold value, operations of the decoder are the same as described in FIG. 8(b). Accordingly, descriptions of overlapped operations will be omitted.

Figure 13A:
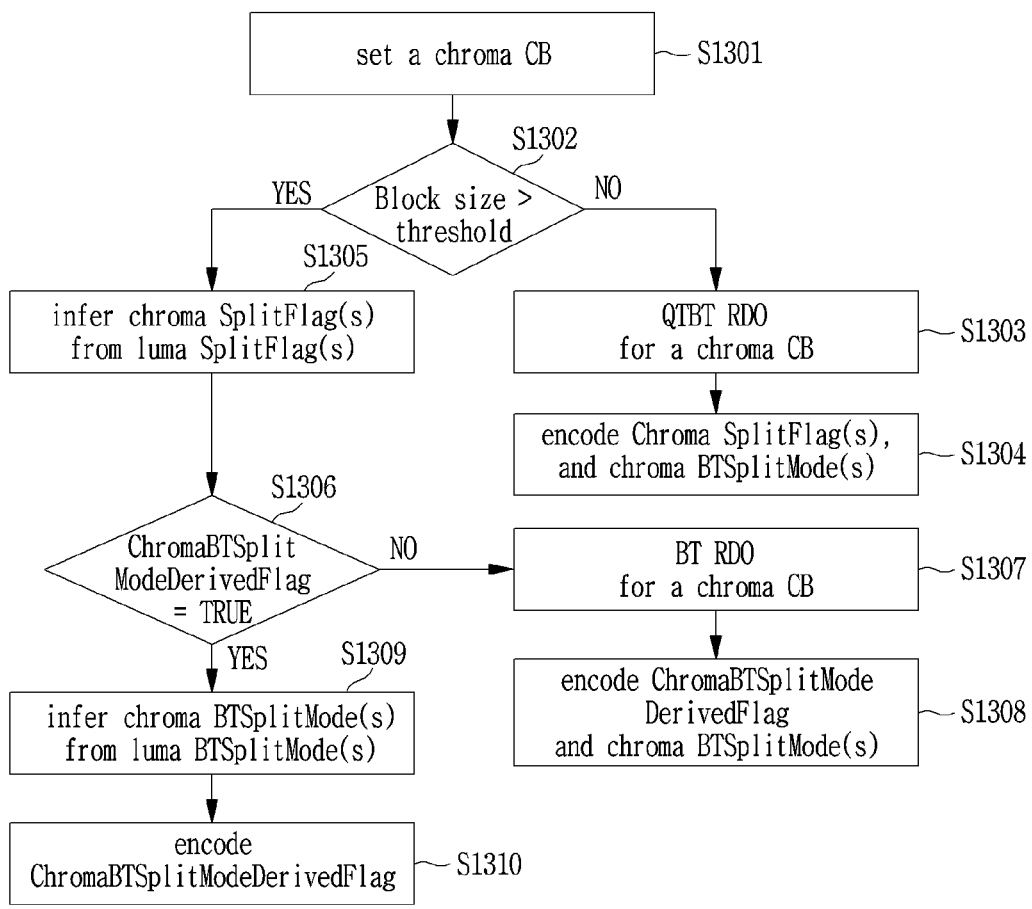
FIG. 13 is a view for illustrating operations corresponding to the example (b) shown in FIG. 11.
Figure 13B:
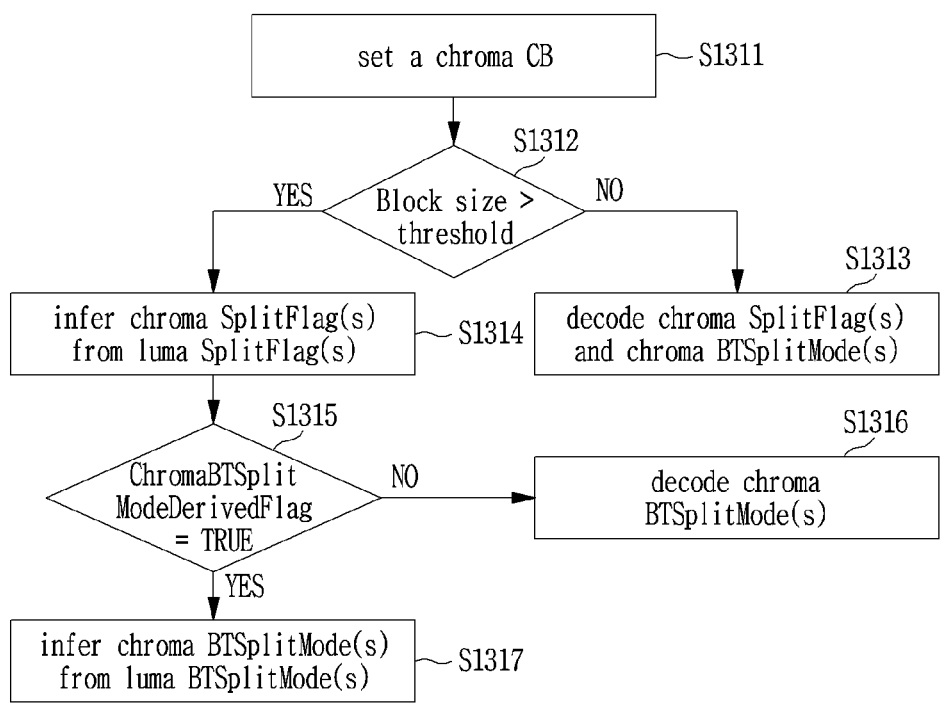

FIG. 13 is a view for illustrating operations corresponding to the example (b) shown in FIG. 11. FIG. 13(a) shows operation of the encoder, and FIG. 13(b) shows operations of the decoder.

In the encoder, as shown in FIG. 13(a), first, in step S1301, a chroma block that becomes a partition target block may be specified. Then, in step S1302, a block size may be compared with a predetermined threshold value. When the block size is not greater than the threshold value, in order to determine an optimized QTBT partition form for the chroma block, in step S1303, rate distortion optimization may be performed. Then, in step S1304, QT partition information or BT partition information or both of the chroma block may be encoded.

When the block size is greater than the threshold value in step S1302, steps S1305 to S1310 may be performed, and the above steps may be substantially respectively correspond to steps S902 to S907 of FIG. 9(a). In other words, in FIG. 13(a), when the block size is greater than the threshold value, operations of the encoder are the same as described in FIG. 9(a). Accordingly, descriptions of overlapped operations will be omitted.

In the decoder, as shown in FIG. 13(b), first, in step S1311, a chroma block that becomes a partition target block may be specified. Then, in step S1312, a block size may be compared with a predetermined threshold value. When the block size is not greater than the threshold value, in step S1313, QT partition information or BT partition information or both of the chroma block may be decoded from a bitstream.

When the block size is greater than the threshold value in step S1312, steps S1314 to S1317 may be performed, and the above steps may substantially respectively correspond to steps S912 to S915 of FIG. 9(b). In other words, in FIG. 13(b), when the block size is greater than the threshold value, operations of the decoder are the same as described in FIG. 9(b). Accordingly, descriptions of overlapped operations will be omitted.

Figure 14A:
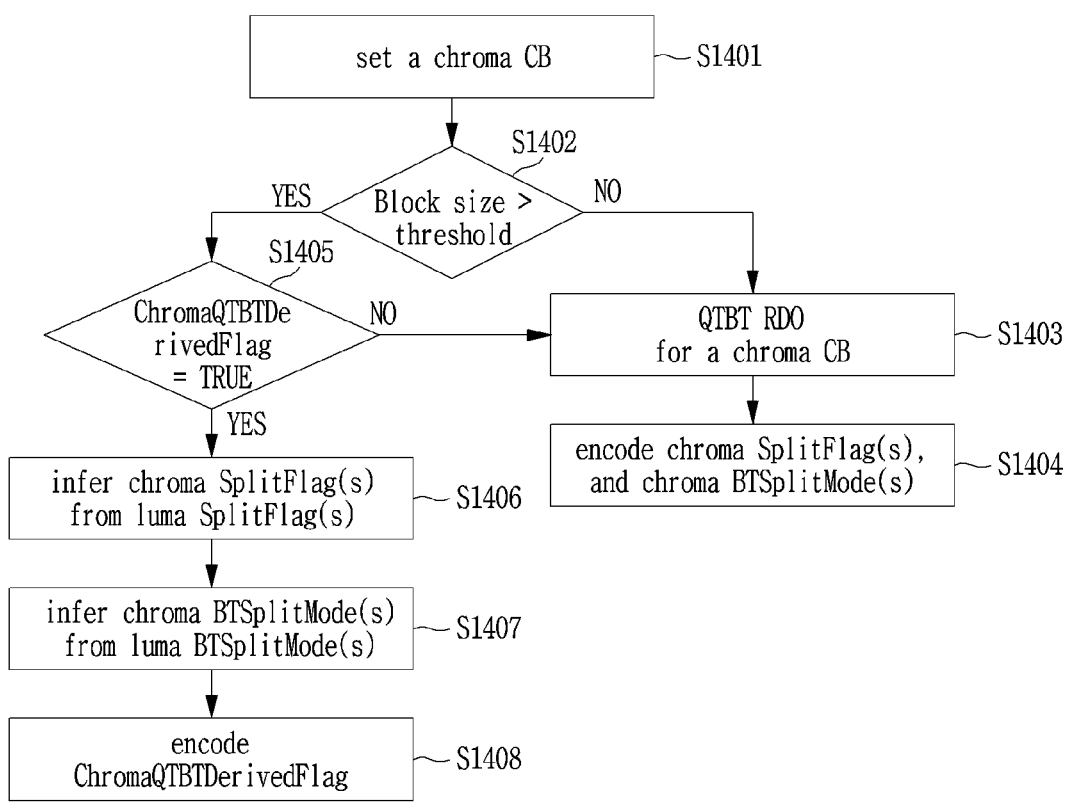
FIG. 14 is a view for illustrating operations corresponding to the example (c) shown in FIG. 11.
Figure 14B:
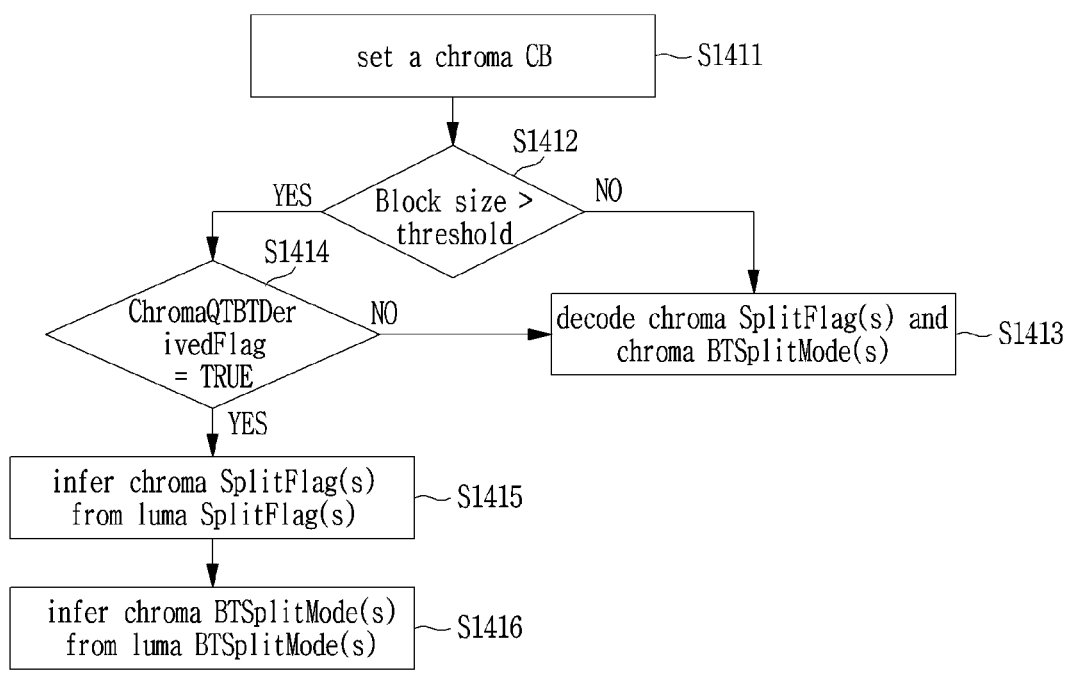

FIG. 14 is a view for illustrating operations corresponding to the example (c) shown in FIG. 11. FIG. 14(a) shows operations of the encoder, and FIG. 14(b) shows operations of the decoder.

In the encoder, as shown in FIG. 14(a), first, in step S1401, a chroma block that becomes a partition target block may be specified. Then, in step S1402, a block size may be compared with a predetermined threshold value. When the block size is not greater than the threshold value, in order to determine an optimized QTBT partition form for the chroma block, in step S1403, rate distortion optimization may be performed. Then, in step S1404, QT partition information or BT partition information or both of the chroma block may be encoded.

When the block size is greater than the threshold value in step S1402, steps S1403 to S1408 may be performed, and the above steps may substantially respectively correspond to steps S1002 to S1007 of FIG. 10(a). In other words, in FIG. 14(a), when the block size is greater than the threshold value, operations of the encoder are the same as described in FIG. 10(a). Accordingly, descriptions of overlapped operations will be omitted.

In the decoder, as shown in FIG. 14(b), first, in step S1411, a chroma block that becomes a partition target block may be specified. Then, in step S1412, a block size may be compared with a predetermined threshold value. When the block size is not greater than the threshold value, in step S1413, QT partition information or BT partition information or both of the chroma block may be decoded from a bitstream.

When the block size is greater than the threshold value in step S1412, steps S1413 to S1416 may be performed, and the above steps may substantially respectively correspond to steps S1012 to S1015 of FIG. 10(b). In other words, in FIG. 14(b), when the block size is greater than the threshold value, operations of the decoder are the same as described in FIG. 10(b). Accordingly, descriptions of overlapped operations will be omitted.

Hereinafter, deriving in a PPS level will be described with reference to FIG. 15.

Partition information of a chroma block for a CU belonging to a specific picture may be derived from partition information of a corresponding luma block. Partitioning of the chroma block for the CU belonging to the specific picture may be identically or partially identically performed with partitioning of the corresponding luma block. Alternatively, the chroma block may be independently partitioned with regardless of the luma block.

Partition information of a block may be derived based on a block size. Herein, the block may mean a chroma block. For example, a size of the chroma block may be compared with an arbitrary threshold value. Descriptions of the arbitrary threshold value are the same as described with reference to FIG. 11.

Information about a relation between partitioning of a chroma block and partitioning of a corresponding luma block may be signaled in a PPS level. For example, at least one of an indicator indicating whether or not partition information of the chroma block for a CU belonging to a specific picture is derived from partition information of the corresponding luma block, an indicator indicating that the chroma block is identically partitioned with the corresponding luma block, an indicator indicating that the chroma block is partially identically partitioned with the corresponding luma block, an indicator representing which partitioning (for example, QT partition or BT partition) among partitionings for the chroma block is identical with partitioning for the luma block, and an indicator indicating that the chroma block is partitioned with regardless of the corresponding luma block may be signaled in a PPS level.

FIG. 15 is a view for illustrating deriving of block partition information in a PPS level. In FIG. 15, each of (a), (b), (c), (d), (e), and (f) may correspond to an example of signaling partition information of a chroma block in a PPS level.

Terms identically used in FIG. 7, FIG. 11, and FIG. 15 among used terms may have identical meanings.

In FIG. 15, ChromaSplitDerivedEnableFlag may be information indicating whether or not QT partition information of a chroma block is derived from QT partition information of a corresponding luma block. ChromaBTSplitModeDerivedEnableFlag may be information indicating whether or not BT partition information of the chroma block is derived from BT partition information of the corresponding luma block. ChromaQTBTDerivedEnableFlag may be information indicating whether or not at least one of QT partition information and BT partition information of the chroma block is derived from at least one of QT partition information and BT partition information of the corresponding luma block.

Information used in FIG. 15 such as ChromaSplitDerivedEnableFlag, ChromaBTSplitModeDerivedEnableFlag, ChromaQTBTDerivedEnableFlag, etc. is information signaled in a PPS level. When the above flag is 0, it may be determined that partition information of the chroma block for all CUs belonging to a specific picture referencing the corresponding PPS is additionally signaled rather than being derived from partition information of the corresponding luma block. Herein, partition information of the chroma block may be signaled in a CU level.

When the above flag is 1, partition information of the chroma block for the CU belonging to the specific picture referencing the corresponding PPS may be derived from partition information of the corresponding luma block. Herein, partition information of the chroma block may not be signaled in a CU level.

For example, each of (a), (b), and (c) of FIG. 15 may correspond to (a), (b), and (c) of FIG. 7. Herein, ChromaSplitDerivedEnableFlag, ChromaBTSplitModeDerivedEnableFlag, and ChromaQTBTDerivedEnableFlag of FIG. 15 may respectively correspond to ChromaSplitDerivedFlag, ChromaBTSplitModeDerivedFlag, and ChromaQTBTDerivedFlag of FIG. 7. However, there is a difference in that in FIG. 15, an indicator is signaled in a PPS level, and in FIG. 7, an indicator is signaled in a CTU level. Accordingly, there is a difference in that information is signaled in different levels, thus obtaining partition information of a chroma block according to each indicator value in (a), (b), and (c) of FIG. 15 may be identically performed with obtaining of partition information of a chroma block described with reference to (a), (b), and (c) of FIG. 7.

Figure 16A:
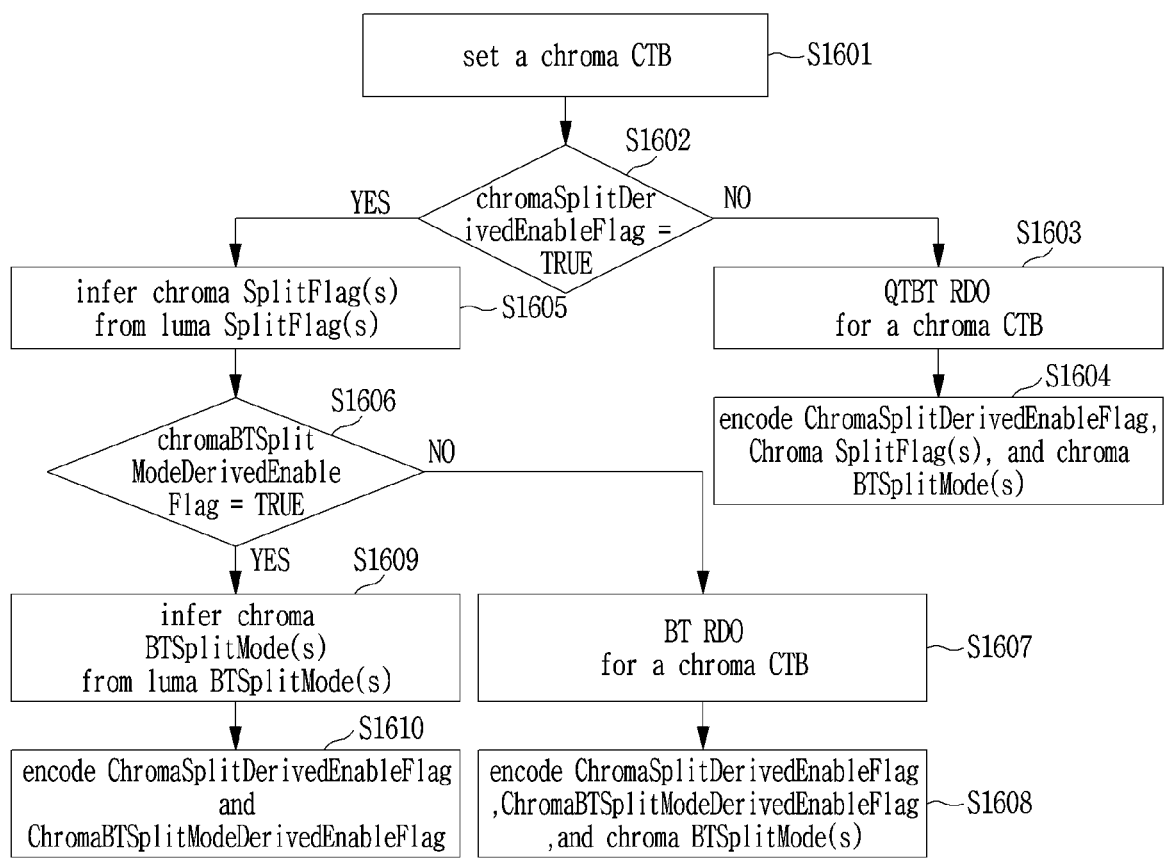
FIG. 16 is a view for illustrating operations corresponding to the example (a) shown in FIG. 15.
Figure 16B:
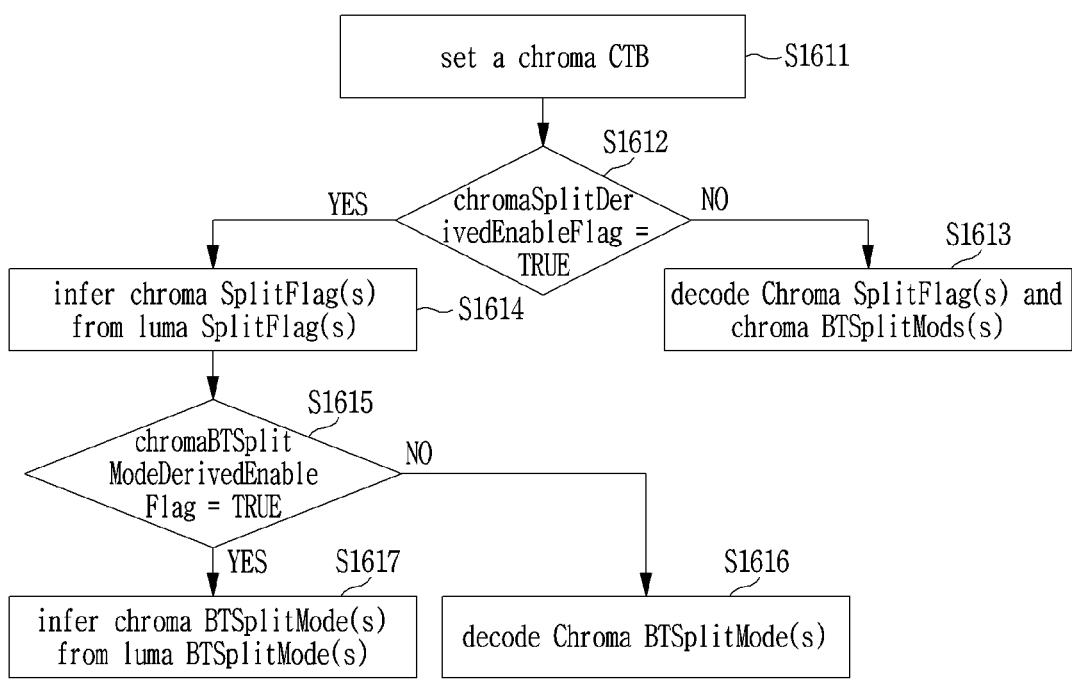

FIG. 16 is a view for illustrating operations corresponding to the example (a) shown in FIG. 15. FIG. 16(a) shows operations of the encoder, and FIG. 16(b) shows operations of the decoder.

Comparing FIG. 16 with FIG. 8, ChromaSplitDerivedFlag and ChromaBTSplitModeDerivedFlag of FIG. 8 are respectively changed to ChromaSplitDerivedEnableFlag and ChromaBTSplitModeDerivedEnableFlag in FIG. 16, the encoder and the decoder substantially perform identical operations. Accordingly, descriptions of respective steps of FIG. 16 are the same as corresponding steps of FIG. 8, thus descriptions of overlapped operations will be omitted.

Figure 17A:
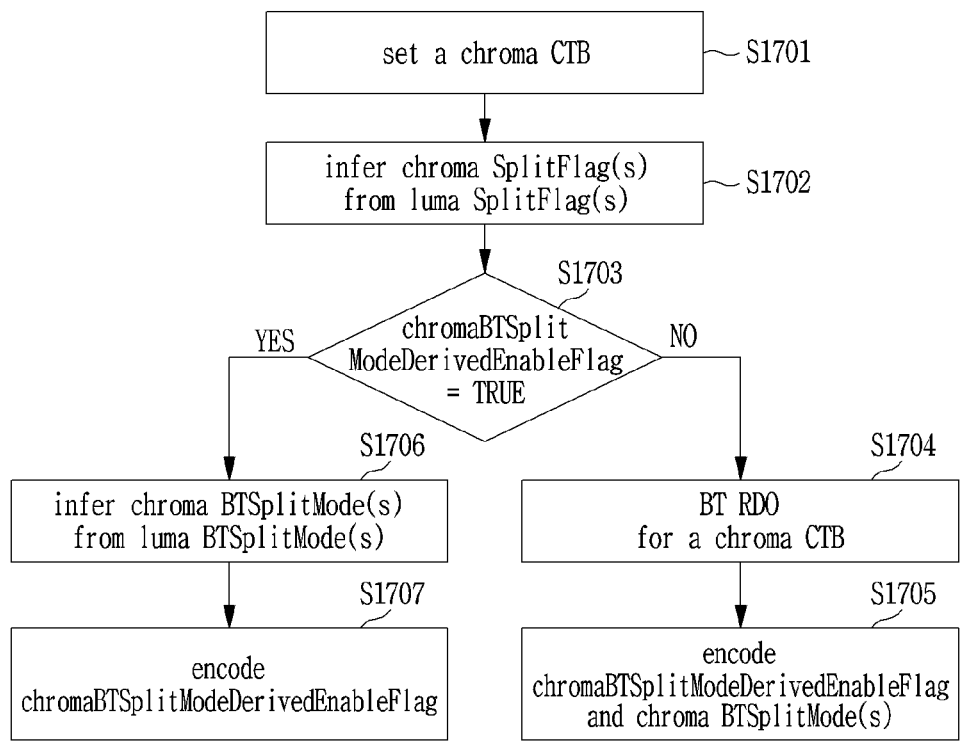
FIG. 17 is a view for illustrating operations corresponding to the example (b) shown in FIG. 15.
Figure 17B:
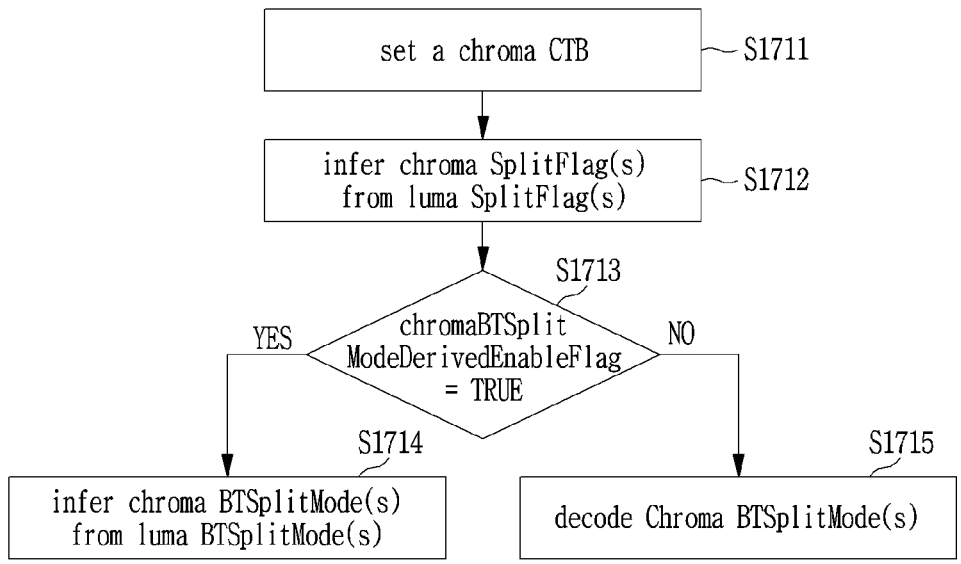

FIG. 17 is a view for illustrating operations corresponding to the example (b) shown in FIG. 15. FIG. 17(a) shows operations of the encoder, and FIG. 17(b) shows operations of the decoder.

Comparing FIG. 17 with FIG. 9, ChromaBTSplitModeDerivedFlag of FIG. 9 is changed to ChromaBTSplitModeDerivedEnableFlag in FIG. 17, and the encoder and the decoder substantially perform identical operations. Accordingly, descriptions of respective steps of FIG. 17 are the same as corresponding steps of FIG. 9, thus descriptions of overlapped operations will be omitted.

Figure 18A:
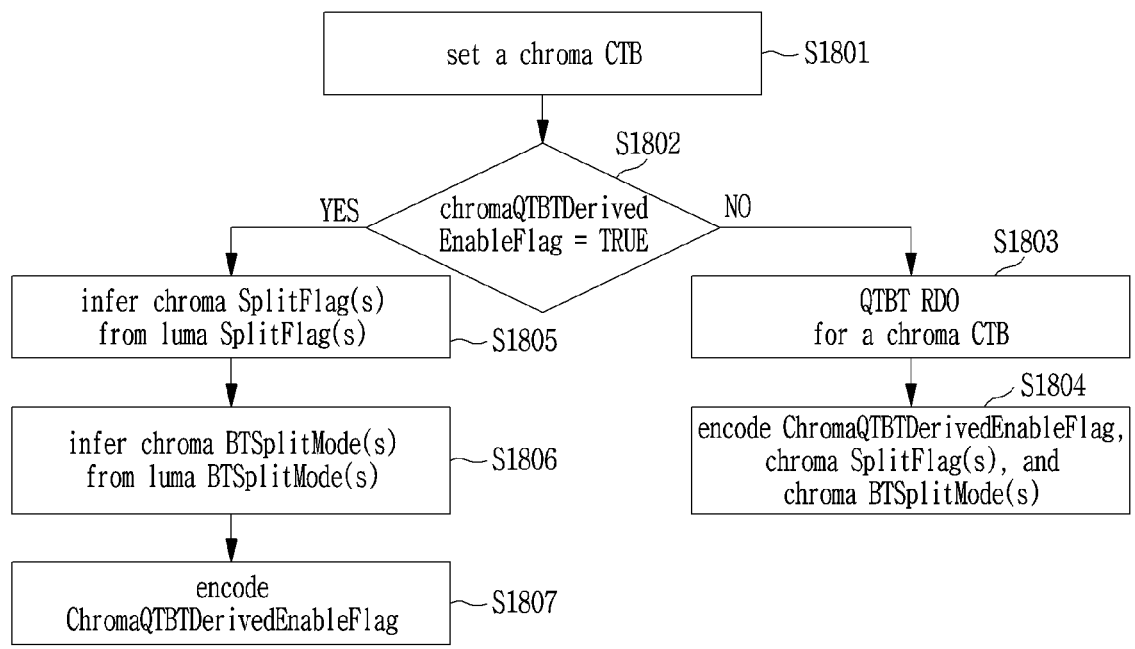
FIG. 18 is a view for illustrating operations corresponding to the example (c) shown in FIG. 15.
Figure 18B:
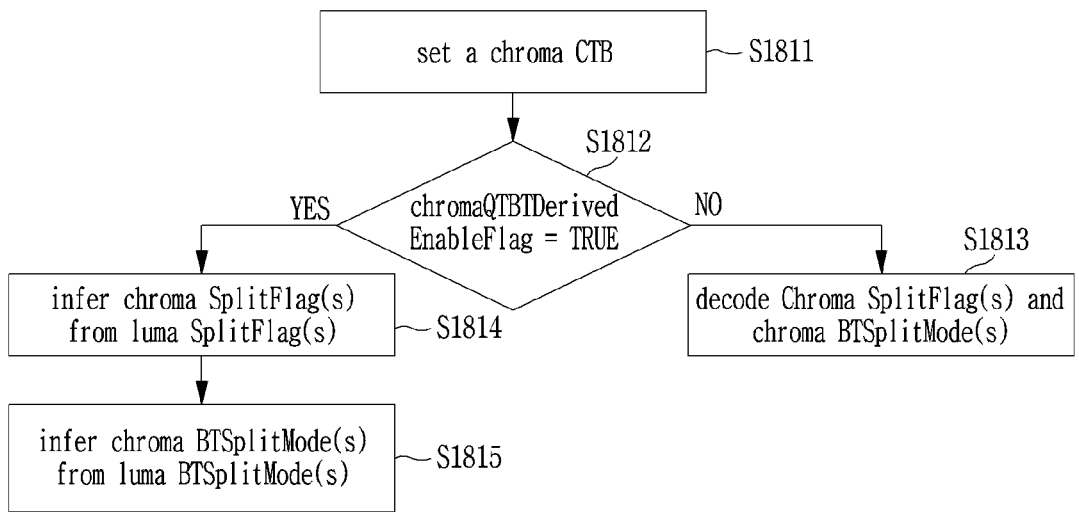

FIG. 18 is a view for illustrating operations corresponding to the example (c) shown in FIG. 15. FIG. 18(a) shows operations of the encoder, and FIG. 18(b) shows operations of the decoder.

Comparing FIG. 18 with FIG. 10, ChromaQTBTDerivedFlagof FIG. 10 is changed to ChromaQTBTDerivedEnableFlag in FIG. 18, and the encoder and the decoder substantially perform identical operations. Accordingly, descriptions of respective steps of FIG. 18 are the same as corresponding steps of FIG. 10, thus descriptions of overlapped operations will be omitted.

Similarly, each of (d), (e), and (f) of FIG. 15 may correspond to (a), (b), and (c) of FIG. 11. Herein, ChromaSplitDerivedEnableFlag, ChromaBTSplitModeDerivedEnableFlag, and ChromaQTBTDerivedEnableFlag of FIG. 15 may respectively correspond to ChromaSplitDerivedFlag, ChromaBTSplitModeDerivedFlag, and ChromaQTBTDerivedFlag in FIG. 11. However, there is a difference in that an indicator is signaled in a PPS level in FIG. 15, and an indicator is signaled in a CTU level in FIG. 11.

Accordingly, obtaining of partition information of a chroma block according to a respective indicator value in (d), (e), and (f) of FIG. 15 may be identically performed with obtaining of partition information of a chroma block which is described with reference to (a), (b), and (c) of FIG. 11.

Figure 19A:
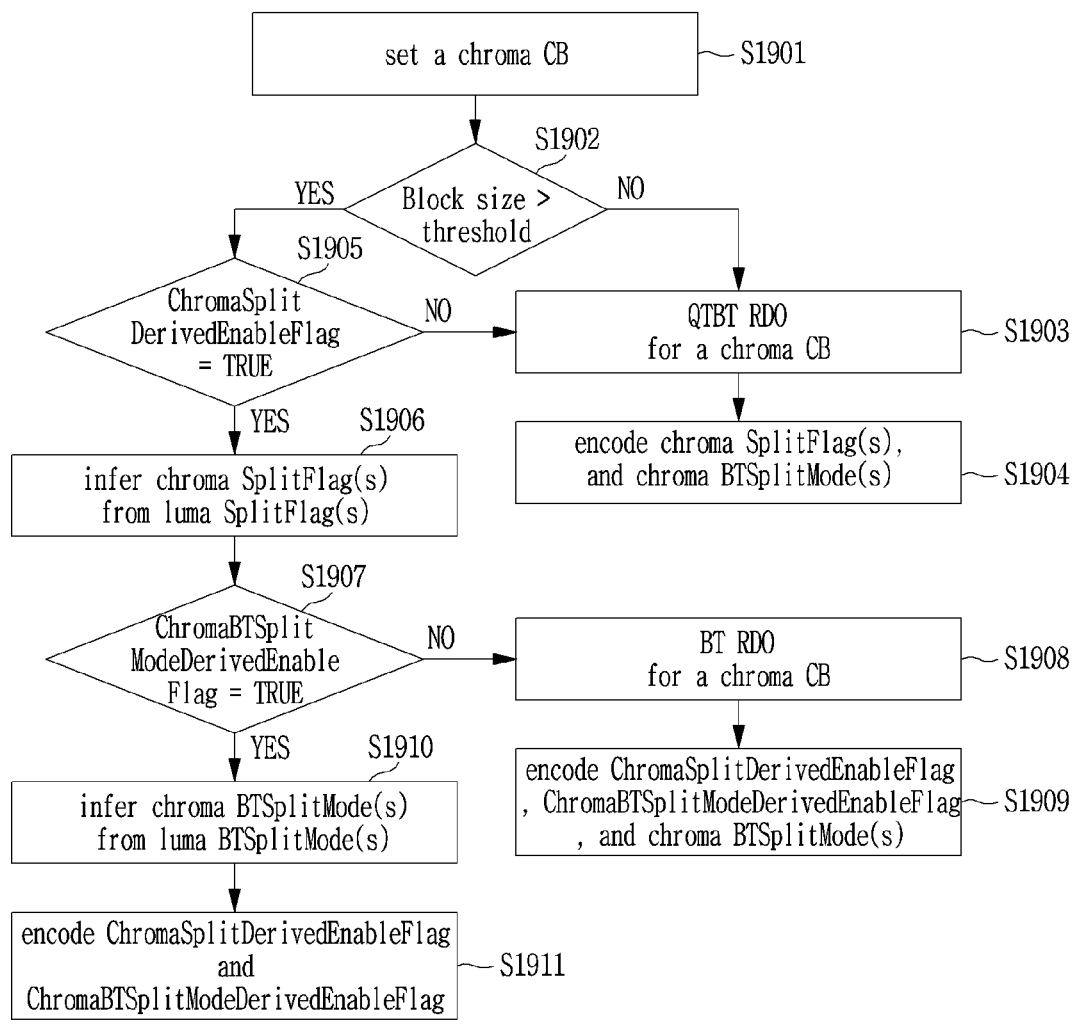
FIG. 19 is a view for illustrating operations corresponding to the example (d) shown in FIG. 15.
Figure 19B:
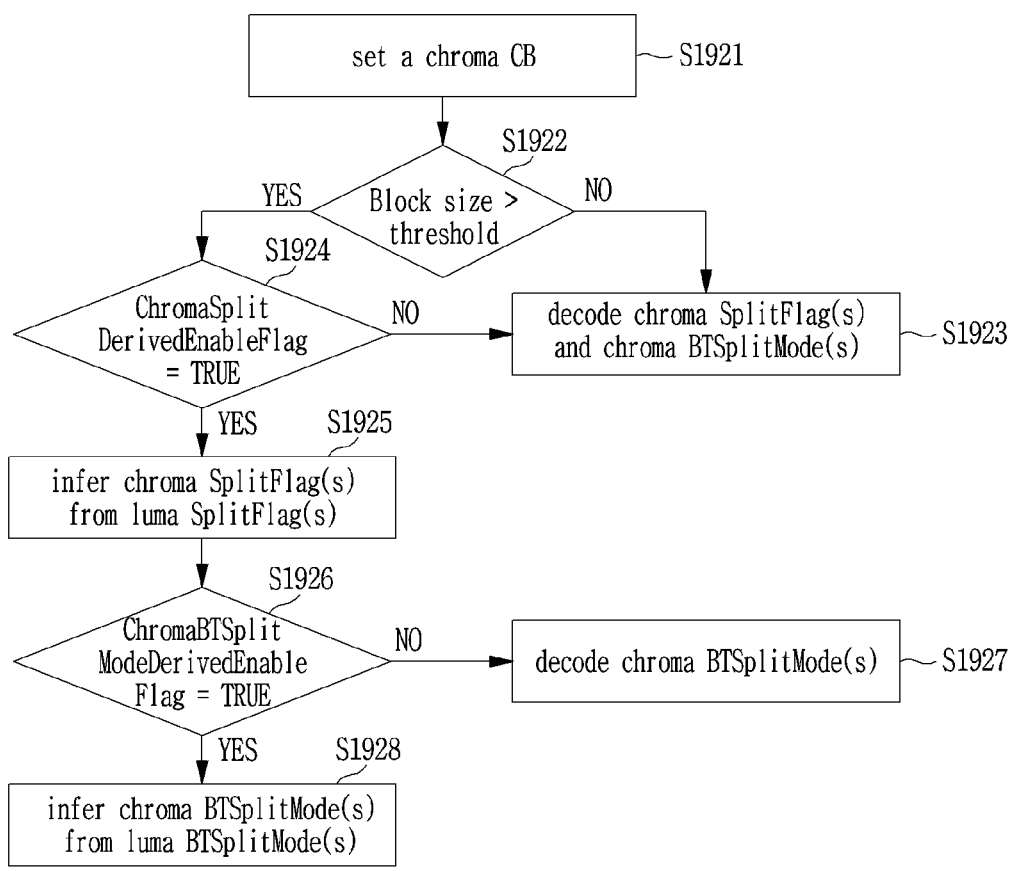

FIG. 19 is a view for illustrating operations corresponding to the example (d) shown in FIG. 15. FIG. 19(a) shows operations of the encoder, and FIG. 19(b) shows operations of the decoder.

Comparing FIG. 19 with FIG. 12, ChromaSplitDerivedFlag and ChromaBTSplitModeDerivedFlag of FIG. 12 are respectively changed to ChromaSplitDerivedEnableFlag and ChromaBTSplitModeDerivedEnableFlag in FIG. 19, and the encoder and the decoder substantially perform identical operations. Accordingly, descriptions of respective steps of FIG. 19 are the same as corresponding steps of FIG. 12, thus descriptions of overlapped operations will be omitted.

Figure 20A:
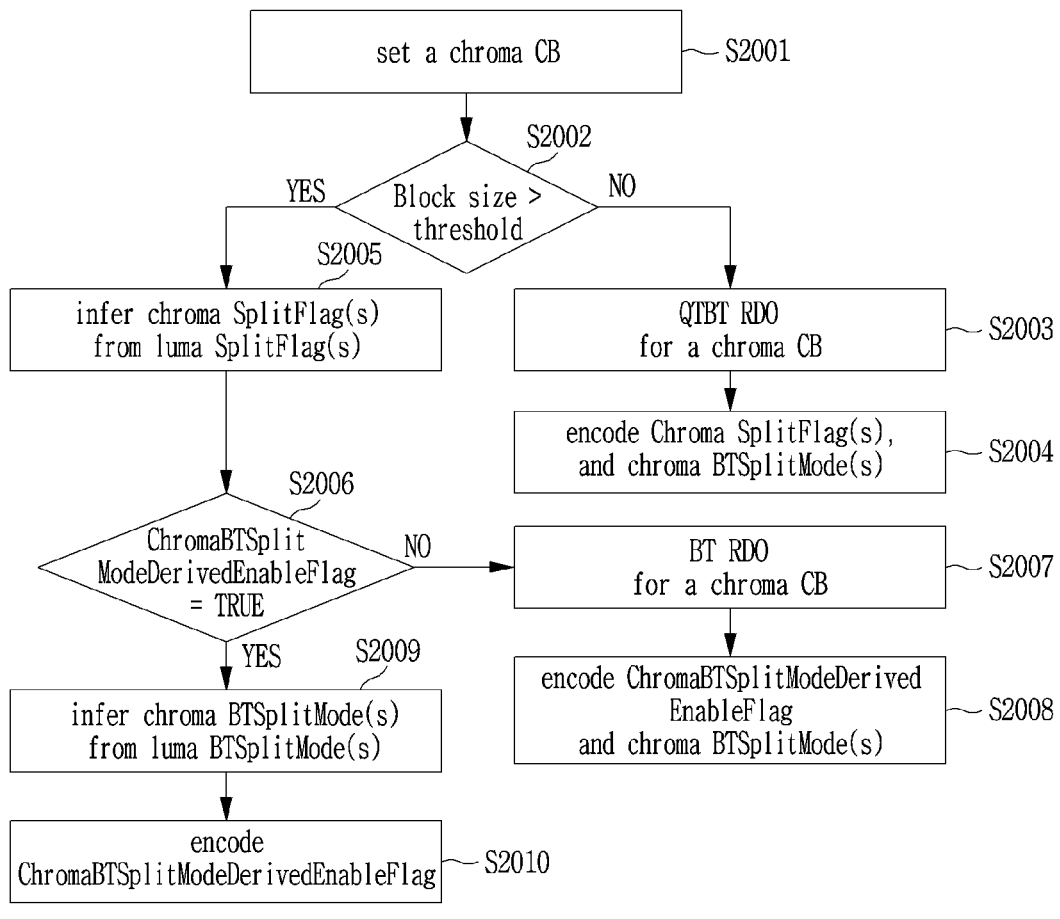
FIG. 20 is a view for illustrating operations corresponding to the example (e) shown in FIG. 15.
Figure 20B:
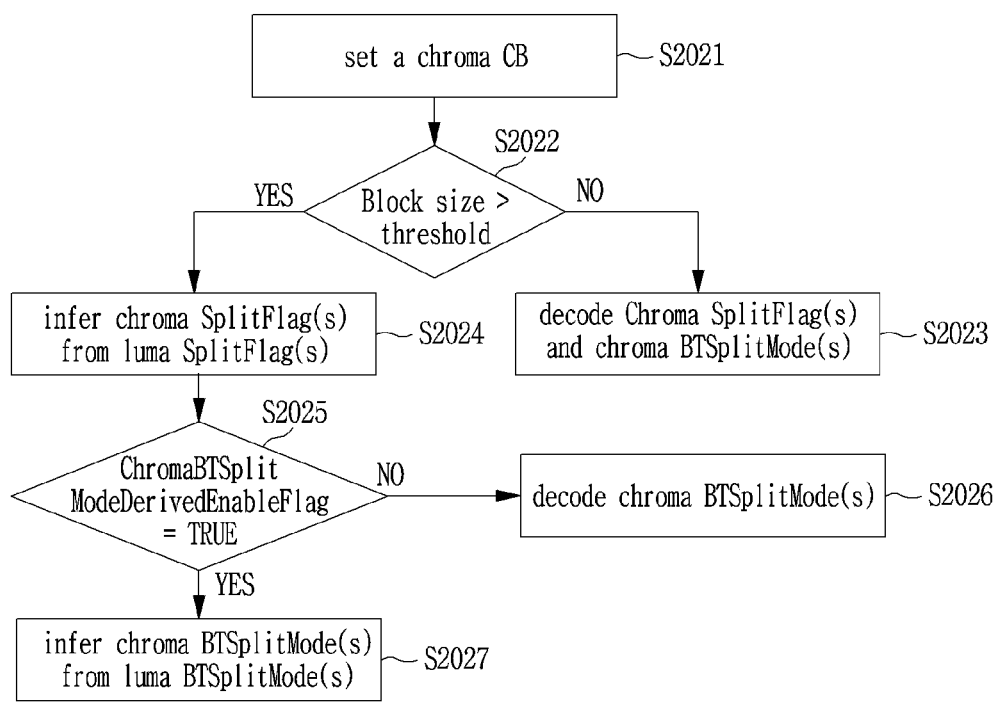

FIG. 20 is a view for illustrating operations corresponding to the example (e) shown in FIG. 15. FIG. 20(a) shows operations of the encoder, and FIG. 20(b) shows operations of the decoder.

Comparing FIG. 20 with FIG. 13, ChromaBTSplitModeDerivedFlag of FIG. 13 is changed to ChromaBTSplitModeDerivedEnableFlag in FIG. 20, and the encoder and the decoder substantially perform identical operations. Accordingly, descriptions of respective steps of FIG. 20 are the same as corresponding steps of FIG. 13, thus descriptions of overlapped operations will be omitted.

Figure 21A:
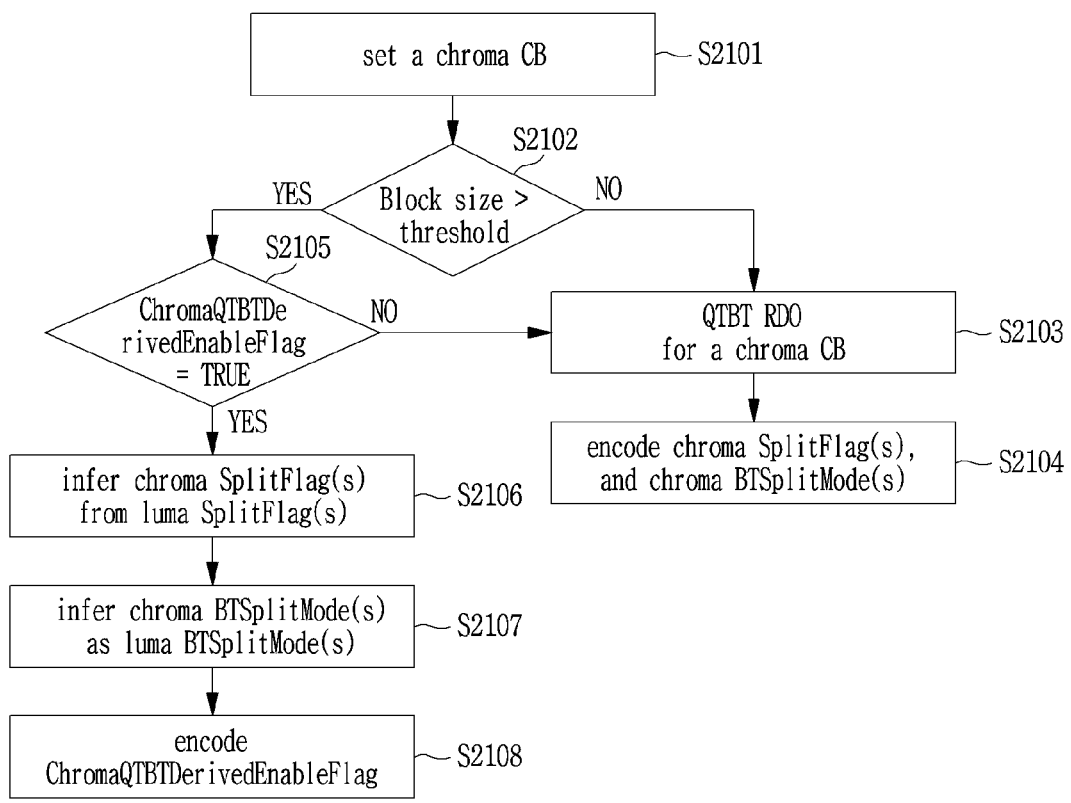
FIG. 21 is a view for illustrating operations corresponding to the example (f) shown in FIG. 15.
Figure 21B:
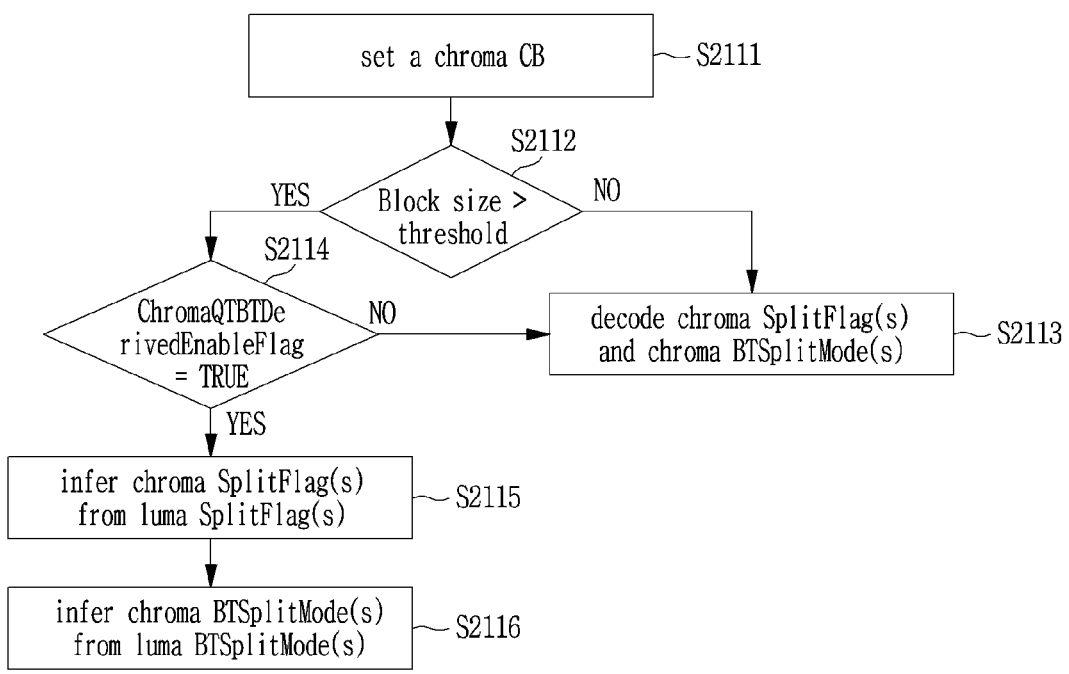

FIG. 21 is a view for illustrating operations corresponding to the example (f) shown FIG. 15. FIG. 21(a) shows operations of the encoder, and FIG. 21(b) shows operations of the decoder.

Comparing FIG. 21 with FIG. 14, ChromaQTBTDerivedFlag of FIG. 14 is changed to ChromaQTBTDerivedEnableFlag in FIG. 21, and the encoder and the decoder substantially perform identical operations. Accordingly, descriptions of respective steps of FIG. 21 are the same as corresponding steps of FIG. 14, thus descriptions of overlapped operations will be omitted.

Different from the example described with reference to FIG. 15, when a flag signaled in a PPS level such as ChromaSplitDerivedEnableFlag, ChromaBTSplitModeDerivedEnableFlag, ChromaQTBTDerivedEnableFlag, etc. is 1, an indicator indicating whether or not partition information of a chroma block in a level lower than the PSS (for example, slice level, tile level alternatively CTU level, etc.) is derived from partition information of a corresponding luma block may be re-signaled. When the indicator is re-signaled in a lower level, partition information of a chroma block for a CU belonging to the corresponding lower level may be obtained based on the re-signaled indicator. Herein, for example, when the lower level is a CTU level, the example described with reference to FIG. 7 or FIG. 11 may be applied.

The example in which the indicator indicating the method of obtaining partition information of the chroma block is signaled in a CTU or picture level has been described with reference to FIG. 7 to FIG. 21. However, the present invention is not limited thereto. For example, an indicator indicating a method of obtaining partition information of a chroma block may be signaled in at least one level of a video, a sequence, a picture, a slice, a tile, a CTU, and a CU. In the respective levels, the indicator may be signaled by being included in a video parameter set (VPS), a sequence parameter set (SPS), a picture parameter set (PPS), a slice header, a tile header, a CTU syntax structure, and a CU syntax structure.

In addition, as shown in FIG. 15(a), when at least two indicators (for example, ChromaSplitDerivedEnableFlag and ChromaBTSplitModeDerivedEnableFlag) are signaled, the indicators may be respectively signaled in different levels. For example, ChromaSplitDerivedEnableFlag may be signaled in a picture level, and ChromaBTSplitModeDerivedEnableFlag may be signaled in a CTU level. Herein, when ChromaSplitDerivedEnableFlag is 1, QT partition information of a chroma block for all CUs belonging to a corresponding picture may be derived from QT partition information of a corresponding luma block. In addition, according to whether ChromaBTSplitModeDerivedEnableFlag that is signaled in a CTU level is 0 or 1, BT partition information of a chroma block may be signaled, or may be derived from BT partition information of a corresponding luma block.

In the example described with reference to FIG. 7 to FIG. 21, a block partition method includes QT partitioning or BT partitioning or both. However, it is not limited thereto. The block partition method may include partition methods of all forms that may be used for partitioning the block such as asymmetric tree (AT) partitioning, triple tree (TT) partitioning, N-ary tree (NT) partitioning, etc.

In addition, a block partition type may include a specific partition type such as horizontal partitioning, vertical partitioning, m:n partitioning, etc. by including the above block partition methods. For example, BT partitioning of horizontal partitioning and BT partitioning of vertical partitioning may be different types. Alternatively, respective AT partitioning having different asymmetric ratios (m:n) may be different types. The above partition method may be applied in combination thereof. For example, when TT partitioning and AT partitioning are applied in combination, TT partitioning differing from at least one of a partition direction (horizontal or vertical), and an asymmetric ratio (l:m:n) may be different types from each other.

The present invention relates to whether to derive block partition information of a first block from block partition information of a corresponding second block or to obtain block partition information of the first block from additionally signaled information. The block partition information may be information indicating at least one of the above block partition methods, and the block partition type. In addition, the block partition information may be signaled in at least one level of a VPS, a SPS, a PPS, a slice header, a tile header, a CTU, a CU, a prediction block, and a transform block.

FIG. 22 is a view showing various types of block partitioning.

FIG. 22(a) shows an example of QT partitioning. A current block may be partitioned into four sub-blocks having identical sizes by QT partitioning.

FIG. 22(b) shows an example of BT partitioning. A current block may be partitioned into two sub-blocks having identical sizes by BT partitioning.

FIG. 22(c) shows an example of applying AT partitioning to BT partitioning. A current block may be partitioned into two sub-blocks having sizes different from each other.

FIG. 22(d) shows an example of TT partitioning. A current block may be partitioned into three sub-blocks by TT partitioning. When AT partitioning is applied to TT partitioning, all or a part of the three sub-blocks may have identical sizes or have sizes different from each other. When TT partitioning is uniform partitioning, three sub-blocks may have identical sizes.

Partition information of a current block may be at least one of indicators indicating whether or not a luma block is partitioned, a partition type of the luma block, whether or not a chroma block is partitioned, a partition type of the chroma block, and whether or not partition information of a corresponding luma block is used. An indicator indicating whether or not partition information of a corresponding luma block is used may be an indicator representing whether or not at least one of whether or not the corresponding luma block is partitioned, and a partition type is used for the chroma block. The indicator indicating whether or not partition information of the corresponding luma block is used may be present with regardless of an indicator representing partitioning and an indicator for a partition type. The partition information may be encoded/decoded in at least one level of a VPS, a SPS, a PPS, a slice header, a tile header, a CTU, a CU, a prediction block, and a transform block as described above.

Partition information of a first block (for example, chroma block) may be determined by the above indicators. Then, based on the determined partition information, a chroma block may be partitioned. When partition information of a second block (for example, corresponding luma block) is used, partition information of the chroma block may be determined based on partition information of the corresponding luma block. When partition information of the corresponding luma block is not used, partition information of the chroma block may be additionally signaled. Whether or not to use partition information of the corresponding luma block may be determined by using the above indicator. Alternatively, for a specific partition method, it may be defined for the encoder/decoder to determine partition information of a chroma block by using partition information of a corresponding luma block without an additional determination. For example, the specific partition method may be at least one of QT partitioning, BT partitioning, and QTBT partitioning. Determining partition information of a chroma block may be independently performed for all or a part of all applicable partition methods. For example, when all applicable partition methods are QT partitioning and BT partitioning, determining partition information for QT partitioning may be performed independent to determining partition information for BT partitioning. Alternatively, partition information of a chroma block may be identically determined for all applicable partition methods. For example, when it is determined to use partition information of a corresponding luma block, for all of QT partitioning and BT partitioning, partition information of a chroma block may be determined by using partition information of the corresponding luma block.

When both whether or not to partition and a partition type (partition direction or partition ratio) have to be specified, a part thereof may be determined from partition information of a corresponding luma block. For example, whether or not to perform BT partitioning for a chroma block may be determined based on partition information of the corresponding luma block, and whether BT partitioning is horizontal partitioning or vertical partitioning may be determined based on additionally signaled information. Herein, whether or not to use partition information of the corresponding luma block may be signaled by the above indicator, or may be pre-defined in the encoder/decoder. Alternatively, whether or not to partition the chroma block may be determined based on additionally signaled information, and a partition type may be determined from partition information of the corresponding luma block. For example, when the partitioning of the chroma block is determined based on additionally signaled information, the partition type may be determined from partition information of the corresponding luma block.

Partition information of a block (luma block or chroma block) may be determined based on at least one of a coding parameter, picture information, slice information, tile information, coding mode information, a quantization parameter QP, a coding block flag CBF, a block size, a block depth, a block form, entropy encoding method, partition information of a neighbor block, and a temporal layer level. The block may be at least one of a coding tree block, a coding block, a prediction block, a transform block, and a block having a predetermined size.

A chroma block may be partitioned by using QT partition information of the chroma block or BT partition information of the chroma block or both (first partition method). Alternatively, the chroma block may be partitioned by using QT partition information of a corresponding luma block and BT partition information of the chroma block (second partition method). Alternatively, the chroma block may be partitioned by using QT partition information of the corresponding luma block, and BT partition information of the corresponding luma block (third partition method). Alternatively, the chroma block may be partitioned by using QT partition information of the corresponding luma block, BT partition information of the corresponding luma block, and BT partition information of the chroma block (fourth partition method).

Which partition method among the first to fourth partition method to be applied to a current block that becomes a partition target may be determined based on picture information. For example, information representing that the current picture is a specific picture by using a PPS may be encoded/decoded. When the current picture is the specific picture, a specific partition method may be applied for a chroma block included in the current picture. Which partition method will be applied for a block included in the specific picture may be signaled in a PPS level or a level higher than the PPS (VPS level, SPS level), or may be pre-defined in the encoder/decoder. Alternatively, a chroma block included in the current picture may be partitioned based on information of a previous picture. For example, when a chroma block included in the previous picture is partitioned by using a second partition method, the chroma block included in the current picture may be partitioned by using the second partition method.

Which partition method among the first to the fourth partition methods will be applied to a current block that becomes a partition target may be determined based on slice information. For example, for a chroma block included in a specific slice, a specific partition method may be applied. The specific slice may be at least one of an I slice, a P slice, and a B slice. Which partition method will be applied to a block included in the specific slice may be signaled in a slice level or a level higher than the slice (VPS level, SPS level, PPS level), or may be pre-defined in the encoder/decoder. Alternatively, a partition method of a chroma block included in the current slice may be determined based on partition information of another slice. For example, the another slice may be a neighbor slice or a previous slice.

Which partition method among the first to the fourth partition method will be applied to a current block that becomes a partition target may be determined based on partition information of at least one neighbor block. The neighbor block may be at least one of a block positioned adjacent to a chroma block, and a block positioned adjacent to a corresponding luma block. For example, when the neighbor block is partitioned by a first partition method, a chroma block may be partitioned by the first partition method. Alternatively, the chroma block may be partitioned by using a part of partition information of the neighbor block. For example, the chroma block may be partitioned by using one of the QT partition information and BT partition information of the neighbor block.

Which partition method among the first to the fourth partition methods will be applied to a current block that becomes a partition target may be determined based on coding mode information. The coding mode information may be information representing whether the current block is an inter-predicted block or an intra-predicted block. Which partition method will be applied to a block encoded in a specific coding mode may be signaled in a prediction block level or a level higher than the prediction block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on an intra coding mode. For example, when an intra prediction mode of the current block corresponds to a predetermined range, one of the first to the fourth partition methods may be used. Which partition method will be applied to a block encoded in an intra encoding mode of a specific range may be signaled in a block level (for example, prediction block) or a level higher than the block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on a quantization parameter. The quantization parameter may be a quantization parameter of a corresponding luma block or a quantization parameter of a chroma block. For example, when a quantization parameter of the current block belongs to a predetermined range, one of the first to the fourth partition methods may be used. Which partition method will be applied to a block encoded in a quantization parameter of a specific range may be signaled in a block level (for example, transform block) or a level higher than the block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on a coding block flag CBF. The coding block flag may be a coding block flag of a corresponding luma block or a quantization parameter of a chroma block. For example, when a coding block flag of the current block has a predetermined value, one of the first to the fourth partition methods may be used. Which partition method will be applied to a block having a specific value as a coding block flag may be signaled in a block level (for example, coding block) or a level higher than the block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on a block size. The block size may be a size of a corresponding luma block or a size of a chroma block. For example, when the current block has a predetermined size, one of the first to the fourth partition methods may be used. Which partition method will be applied to a block having a specific size may be signaled in a block level or a level higher than the block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on a partition depth of a block. The partition depth of the block may be a partition depth of a corresponding luma block or a partition depth of a chroma block. For example, when a partition depth of the current block has a predetermined depth, one of the first to the fourth partition methods may be used. Which partition method will be applied to a block of a specific partition depth may be signaled in a block level or a level higher than the block (VPS level, SPS level, PPS level, slice level, tile level, CTU level, CU level), or may be pre-defined in the encoder/decoder.

Which partition method among the first to the fourth partition methods is applied to a current block that becomes partition target may be determined based on a block form. The block form may be a form of a corresponding luma block or a form of a chroma block. The block form may be determined by an aspect ratio. For example, when a form of the current block has a predetermined form, one of the first to the fourth partition methods may be used. Which partition method will be applied to a block having a specific form may be signaled in a block level or a level higher than the block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on an entropy encoding method that is applied to a block. The entropy encoding method may include various entropy encoding methods by including context adaptive binary arithmetic coding (CABAC), and context adaptive variable length coding (CAVLC). For example, when a specific entropy encoding method is applied to the current block, one of the first to the fourth partition methods may be used. Which partition method will be applied to a block encoded by a specific entropy encoding method may be signaled in a block level or a level higher than the block (VPS level, SPS level, PPS level, slice level, tile level, CTU level, CU level), or may be pre-defined in the encoder/decoder.

Which partition method among the first to the fourth partition methods will be applied to a current block that becomes a partition target may be determined based on a temporal layer level of the current block. The temporal layer level may mean a temporal layer ID (temporal identifier) of a temporal layer to which the current block belongs. For example, when the current block belongs to a specific temporal layer level, one of the first to the fourth partition methods may be used. Which partition method will be applied to a block belonging to a specific temporal layer level may be signaled in a block level or a level higher than the block (VPS level, SPS level, PPS level, slice level, tile level, CTU level, CU level), or may be pre-defined in the encoder/decoder.

Alternatively, according to a temporal layer level of a current block, a partition depth may be adaptively set. For example, according to whether a temporal layer ID of the current block corresponds to a specific value or belongs to a specific value range, a partition depth for at least one of QT partitioning and BT partitioning may be differently set. Herein, a partition depth of a block having a temporal layer level included in the specific value or the specific value range may be signaled in a block level or a level higher than the block (VPS level, SPS level, PPS level, slice level, tile level, CTU level, CU level), or may be pre-defined in the encoder/decoder.

As described above, which partition method among the first to the fourth partition methods will be applied to a current block that is a partition target may be determined based on various types of coding information. However, it is not limited to the above examples. For example, in addition to the coding information described above, a partition method for a current block may be determined based on other information. In addition, in order to partition the current block, in addition to the first to the fourth partition methods, various partition methods according to a partition tree or partition form or both may be used.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method performed by an image decoding apparatus, the method comprising:
   determining a partitioning method of a current block as one of a first partitioning method and a second partitioning method based on slice information of a slice to which the current block belongs and information on partitioning of the current block;
   obtaining a coding block by partitioning the current block using the partitioning method; and
   reconstructing the obtained coding block, and
   wherein, when the partitioning method of the current block is determined to the first partitioning method, a luma block and a chroma block corresponding to the current block are partitioned by a same partitioning structure,
   wherein, when the partitioning method of the current block is determined to the second partitioning method, and a size of the current block is larger than a predetermined threshold value, the luma block and the chroma block corresponding to the current block are partitioned by a same partitioning structure, and
   wherein, when the partitioning method of the current block is determined to the second partitioning method, and the size of the current block is less than or equal to the predetermined threshold value, the luma block and the chroma block corresponding to the current block are partitioned by a different partitioning structure from each other.

2. The image decoding method of claim 1,
   wherein the slice information is a slice type of the slice to which the current block belongs.

3. The image decoding method of claim 2,
   wherein the determining the partitioning method of the current block comprises determining whether a slice type of the slice to which the current block belongs is I slice or not.

4. The image decoding method of claim 1,
   wherein the information on partitioning of the current block is signaled in a sequence parameter set (SPS).

5. The image decoding method of claim 1,
   wherein the information on partitioning of the current block is a flag information.

6. The image decoding method of claim 1, wherein the predetermined threshold value is 64.

7. The image decoding method of claim 1,
wherein, when the luma block and the chroma block corresponding to the current block is partitioned by the different method, whether the chroma block is partitioned or not is derived based on at least a size of a luma block corresponding to the chroma block and information on partitioning of the luma block corresponding to the chroma block.

8. An image encoding method performed by an image encoding apparatus, the method comprising:
determining a partitioning method of a current block as one of a first partitioning method and a second partitioning method based on slice information of a slice to which the current block belongs and information on partitioning of the current block;
obtaining a coding block by partitioning the current block using the partitioning method; and
encoding the obtained coding block, and
wherein, when the partitioning method of the current block is determined to the first partitioning method, a luma block and a chroma block corresponding to the current block are partitioned by a same partitioning structure,
wherein, when the partitioning method of the current block is determined to the second partitioning method, and a size of the current block is larger than a predetermined threshold value, the luma block and the chroma block corresponding to the current block are partitioned by a same partitioning structure, and
wherein, when the partitioning method of the current block is determined to the second partitioning method, and the size of the current block is less than or equal to the predetermined threshold value, the luma block and the chroma block corresponding to the current block are partitioned by a different partitioning structure from each other.

9. The image encoding method of claim 8,
wherein the slice information is a slice type of the slice to which the current block belongs.

10. The image encoding method of claim 9,
wherein the determining the partitioning method of the current block comprises determining whether a slice type of the slice to which the current block belongs is I slice or not.

11. The image encoding method of claim 8,
wherein the information on partitioning of the current block is signaled in a sequence parameter set (SPS).

12. The image encoding method of claim 8,
wherein the information on partitioning of the current block is a flag information d.

13. The image encoding method of claim 8,
wherein the predetermined threshold value is 64.

14. A non-transitory recording medium storing a bitstream formed by a method for encoding a video signal, the method comprising:
determining a partitioning method of a current block as one of a first partitioning method and a second partitioning method based on slice information of a slice to which the current block belongs and information on partitioning of the current block;
obtaining a coding block by partitioning the current block using the partitioning method; and
encoding the obtained coding block, and
wherein, when the partitioning method of the current block is determined to the first partitioning method, a luma block and a chroma block corresponding to the current block are partitioned by a same partitioning structure,
wherein, when the partitioning method of the current block is determined to the second partitioning method, and a size of the current block is larger than a predetermined threshold value, the luma block and the chroma block corresponding to the current block are partitioned by a same partitioning structure, and
wherein, when the partitioning method of the current block is determined to the second partitioning method, and the size of the current block is less than or equal to the predetermined threshold value, the luma block and the chroma block corresponding to the current block are partitioned by a different partitioning structure from each other.

* * * * *